US012434873B2

(12) United States Patent
Zhou

(10) Patent No.: US 12,434,873 B2
(45) Date of Patent: Oct. 7, 2025

(54) FRIES BOX-PACKING MACHINE

(71) Applicant: Yindu Kitchen Equipment Co., Ltd., Zhejiang (CN)

(72) Inventor: Junjie Zhou, Zhejiang (CN)

(73) Assignee: Yindu Kitchen Equipment Co., Ltd., Zhejiang (CN)

( * ) Notice: Subject to any disclaimer, the term of this patent is extended or adjusted under 35 U.S.C. 154(b) by 0 days.

(21) Appl. No.: 18/617,261

(22) Filed: Mar. 26, 2024

(65) Prior Publication Data

US 2025/0229926 A1 Jul. 17, 2025

(30) Foreign Application Priority Data

Jan. 17, 2024 (CN) .......................... 202410068370.2

(51) Int. Cl.
*B65B 1/08* (2006.01)
*A47J 37/12* (2006.01)
*B25J 11/00* (2006.01)
*B65B 1/32* (2006.01)
*B65B 25/00* (2006.01)
(Continued)

(52) U.S. Cl.
CPC ......... *B65B 25/001* (2013.01); *A47J 37/1228* (2013.01); *B25J 11/0045* (2013.01); *B65B 1/08* (2013.01); *B65B 1/32* (2013.01); *B65B 43/44* (2013.01); *B65B 43/60* (2013.01); *B65B 57/02* (2013.01); *B65G 59/062* (2013.01); *B65G 59/106* (2013.01)

(58) Field of Classification Search
CPC ........... B65B 1/08; B65B 1/32; B65B 25/001; B65B 43/185; B65B 43/265; B65B 43/44; B65B 43/46; B65B 43/60; B65B 57/02; B65G 59/062; B65G 59/106; B25J 11/0045; A47J 37/1228

USPC ........................... 53/250, 253; 221/113, 211
See application file for complete search history.

(56) References Cited

U.S. PATENT DOCUMENTS 3,275,189 A * 9/1966 Goldsborough et al. ..................... B65B 43/44
221/36
3,896,715 A * 7/1975 Mascret .............. A47J 37/1228
99/356
(Continued)

FOREIGN PATENT DOCUMENTS

JP          S58203819 A   * 11/1983   ............. B65B 43/44
JP          S6123025 A    *  1/1986   ............. B65B 43/44

*Primary Examiner* — Stephen F. Gerrity
(74) *Attorney, Agent, or Firm* — Nixon & Vanderhye PC

(57) ABSTRACT

The present disclosure provides a fries box-packing machine, relating to the technical field of food packaging. The fries box-packing machine includes a frame body, a box storage component, and a box-taking mechanism. The box-taking mechanism is arranged on the upper mounting plate, and the box-taking mechanism is configured to sequentially move the paper box of the box storage component below the upper mounting plate. The lifting mechanism of the box-taking mechanism of the fries box-packing machine provided by the present disclosure can elevate the rotating mounting frame, thereby adjusting the height of the suction cup assembly. This allows the suction cup assembly to move the paper box from the upper end of the upper mounting plate to the lower end of the upper mounting plate. When the suction cup assembly attaches to the paper box, the lifting mechanism separates the paper box from the box storage component.

15 Claims, 37 Drawing Sheets

(51) Int. Cl.
  *B65B 43/44*  (2006.01)
  *B65B 43/60*  (2006.01)
  *B65B 57/02*  (2006.01)
  *B65G 59/06*  (2006.01)
  *B65G 59/10*  (2006.01)

(56) References Cited

U.S. PATENT DOCUMENTS

| | | | | |
|---|---|---|---|---|
| 4,170,861 | A | * | 10/1979 | Snyder et al. .......... B65B 43/44 53/381.4 |
| 4,322,067 | A | * | 3/1982 | Masselin et al. .... B65H 3/0883 271/99 |
| 5,400,838 | A | * | 3/1995 | Schjerven et al. .. G07F 17/0078 141/144 |
| 5,605,091 | A | * | 2/1997 | Garber ................ A47J 37/1228 99/356 |
| 2008/0092752 | A1 | * | 4/2008 | Morin .................... G07F 9/105 99/356 |
| 2014/0138163 | A1 | * | 5/2014 | Taylor et al. ............. B65B 1/32 177/1 |

\* cited by examiner

FRIES BOX-PACKING MACHINE

CROSS-REFERENCE TO RELATED APPLICATION

The present disclosure claims the priority to the Chinese patent application with the filing No. 2024100683702 filed with the Chinese Patent Office on Jan. 17, 2024, and entitled "Fries Box-Packing Machine", the contents of which are incorporated herein by reference in entirety.

TECHNICAL FIELD

The present disclosure relates to the technical field of food packaging, in particular to a fries box-packing machine.

BACKGROUND ART

In Western cuisine or fast food, fries are essential. The paper boxes used for packaging the fries are three-dimensional. When selling the fries, the staff manually sprinkles salt using a salt shaker. Subsequently, based on different customer requests, they use a fries shovel to transfer the fries into various-sized boxes (large, medium, small, etc.). This process involves high labor intensity, uneven salt sprinkling, and challenges in controlling the number of fries in each box. Currently, available box-packing machines in the market mostly handle flat and sheet-like boxes. The boxes are typically delivered in a flat-folded state and need to be folded into box shapes along pre-fold lines when required for packing. Machines of this type are typically used in factories or processing plants. However, there is currently no machine designed for retail use in Western cuisine establishments that utilizes three-dimensional boxes for packaging fries.

SUMMARY

The objective of the present disclosure is to provide a fries box-packing machine so as to address the technical issues of low efficiency, manual control of packing quantity, and unstable quality in the process of packing fries.

The present disclosure provides a fries box-packing machine, comprising a frame body, a box storage component, and a box-taking mechanism, wherein the frame body is provided thereon with an upper mounting plate, the box storage component is arranged on an upper end surface of the upper mounting plate, the box-taking mechanism is arranged on the upper mounting plate. The box-taking mechanism is configured to sequentially move a paper box of the box storage component below the upper mounting plate.

The upper mounting plate is provided thereon with a box-taking assembly opening. The box-taking mechanism comprises a mounting bracket, a lifting mechanism, and a pusher.

The mounting bracket is arranged on the upper mounting plate, and the lifting mechanism passes through the box-taking assembly opening. A movable end of the lifting mechanism is provided with a rotating mounting frame. The rotating mounting frame is provided thereon with a rotator. The rotator is provided thereon with a pushing bracket.

The pusher is arranged on the pushing bracket, and a movable end of the pusher is provided with a suction cup bracket. The suction cup assembly is arranged on the suction cup bracket. The suction cup assembly is configured to suction the paper box.

In optional embodiments, the box storage component comprises a rotating power mechanism, a rotating bracket, and multiple box cylinders arranged on the rotating bracket.

The rotating bracket is arranged on the rotating power mechanism, wherein the rotating power mechanism enables the rotating bracket to rotate. The multiple box cylinders are arranged on the rotating bracket. The box cylinders are evenly arranged along a circumference of the rotating bracket.

Each box cylinder is provided with a plug-in component, and an insertion slot matching the plug-in component is arranged on the rotating bracket.

The box cylinder is provided therein with a lower limit baffle. The multiple paper boxes are assembled inside the box cylinder, wherein openings of the paper boxes face downward and a bottommost paper box abuts against the lower limit baffle. The lower limit baffle is configured to prevent the paper boxes from detaching from the box cylinder at a lower end of the box cylinder.

At least one of the box cylinders has its lower opening facing the box-taking assembly opening, and the suction cup assembly is configured to suction the paper box from inside of the box cylinder.

In optional embodiments, a paper box rotation mechanism and a weighing and packing mechanism are further comprised, wherein the weighing and packing mechanism is configured to load fries based on weight into the paper box of the paper box rotation mechanism.

The paper box rotation mechanism comprises a connecting bracket, a rotation driver, and a rotating disc, wherein the connecting bracket is arranged on the frame body, and the rotation driver is arranged on the connecting bracket. The rotating disc is rotationally arranged on the rotation driver.

Multiple shaking mechanisms are arranged on the rotating disc, wherein each shaking mechanism is provided with a box-holding component and each box-holding component is provided with a second sensor component.

The box-holding component is configured to place the paper box, and the second sensor component is configured to detect whether there is a paper box inside the box-holding component.

In optional embodiments, a lower end surface of the rotating disc is provided with a transition sleeve. A lower end of the transition sleeve is provided with a slip ring and a slip ring base, wherein the slip ring is arranged on the slip ring base. The slip ring base is configured to connect with a power supply device, and the slip ring is configured to connect with the shaking mechanism.

The transition sleeve is provided thereon with a wire through-hole, and the connecting wire that is connected to the shaking mechanism passes through the wire through-hole.

In optional embodiments, the shaking mechanism comprises a shaking motor, an eccentric wheel, and a box-holding mounting plate. The shaking motor is mounted on the rotating disc, and the eccentric wheel is arranged at an output end of the shaking motor.

The box-holding mounting plate is arranged on the rotating disc, and a first sliding component is arranged between the box-holding mounting plate and the rotating disc.

The box-holding mounting plate is provided thereon with a first sliding groove, and the eccentric wheel is arranged inside the first sliding groove. The eccentric wheel enables the box-holding mounting plate to move back and forth in a direction restricted by the first sliding component.

In optional embodiments, the shaking mechanism comprises a shaking motor, an eccentric wheel, and a box-holding mounting plate. The shaking motor is mounted on the rotating disc, and the eccentric wheel is arranged at an output end of the shaking motor.

One end of the box-holding mounting plate is arranged with a swing rod, and an end of the swing rod away from the box-holding mounting plate is hinged on the rotating disc.

The swing rod is provided thereon with a second sliding groove, and the eccentric wheel is arranged inside the second sliding groove. The rotating disc is provided thereon with a limit component, wherein the limit component is provided with a lateral opening. The swing rod is assembled in the lateral opening, and the limit component is configured to restrict the upward and downward movement of the swing rod.

In optional embodiments, the box-holding component comprises a box-holding main body and a holding hoop, wherein the holding hoop is sheathed on the box-holding main body and the holding hoop is fixed on the box-holding mounting plate.

A lower end of the box-holding main body is provided with two lower support protrusions, and the two lower support protrusions cooperate to support the paper box. The box-holding main body is provided thereon with a first notch, and the paper box is taken out from the box-holding main body through the first notch.

A detection hole is arranged on the box-holding main body, and the second sensor component detects whether there is a paper box inside the box-holding main body through the detection hole.

In optional embodiments, the weighing and packing mechanism comprises a large funnel component, a vibrating tray, and a packing component.

The large funnel component comprises a large funnel and a large funnel bracket. The large funnel is arranged on the large funnel bracket, and the large funnel bracket is arranged on the frame body.

The vibrating tray is arranged at a lower end of the large funnel. The vibrating tray is configured to convey the fries from the large funnel to the packing component.

In optional embodiments, the packing component comprises a material box, a material box bracket, a packing mounting plate, and a packing motor.

The material box is configured to receive the fries dropped from the vibrating tray, and the material box is arranged on the material box bracket.

A weighing sensor is arranged on the frame body, and a weighing support bracket is arranged on the weighing sensor.

The packing mounting plate is hinged on the weighing support bracket, and the packing motor is arranged on the packing mounting plate.

The material box bracket is arranged on the packing mounting plate through a second sliding component. The material box bracket is provided thereon with a third sliding groove, and the eccentric wheel on the packing motor is arranged within the third sliding groove. The packing motor enables the material box bracket to move back and forth in a direction restricted by the second sliding component.

A packing rotation motor is arranged on the weighing support bracket, and the packing rotation motor is connected to the packing mounting plate and enables the packing mounting plate to rotate.

In optional embodiments, the weighing and packing mechanism further comprises a small funnel component. The small funnel component is arranged on a side of the large funnel component away from the vibrating tray.

The small funnel component comprises a small funnel and a small funnel bracket, wherein the small funnel bracket is arranged on the frame body, and the small funnel is arranged on the small funnel bracket. The small funnel is configured to receive the fries poured out from the material box.

The rotation driver enables the rotating disc to rotate, causing the box-holding component to move sequentially below the small funnel component.

In optional embodiments, a seasoning mechanism is further comprised, wherein the seasoning mechanism comprises a seasoning bracket, and a salt hopper component and a power component that are arranged on the seasoning bracket.

The seasoning bracket is arranged on the frame body, and the salt hopper component is arranged above the material box.

The power component comprises a seasoning motor, a drive bracket, a drive plate, and a beating rod; the drive bracket is arranged at an upper end of the seasoning bracket; and the seasoning motor is arranged on the drive bracket.

The drive plate is arranged on a side of the drive bracket way from the seasoning motor, and a third sliding component is arranged between the drive plate and the drive bracket.

The drive plate is provided thereon with a fourth sliding groove, an eccentric wheel of the seasoning motor is arranged within the fourth sliding groove, and the beating rod is arranged on the drive plate.

The salt hopper components comprise a salt hopper main body, a salt hopper cover, a material feeding rod, and a reset spring. The salt hopper main body is arranged on the seasoning bracket.

A lower end of the salt hopper main body is provided with a material feeding hole, and an upper limit hole is arranged on the salt hopper cover.

The material feeding rod comprises an upper guiding rod, a middle limiting rod, and a lower sealing end which are sequentially arranged. The upper guiding rod passes through the upper limit hole, the middle limiting rod is arranged inside the salt hopper main body, and the lower sealing end is configured to seal the material feeding hole.

The reset spring is sheathed on the upper guiding rod, and a limit nut is arranged on the upper guiding rod. One end of the reset spring abuts against the limit nut and the other end abuts against the salt hopper cover.

The reset spring is configured to impart a tendency for the lower sealing end to move toward the beating rod. A diameter of the middle limiting rod is larger than the upper limit hole. When the middle limiting rod abuts the salt hopper cover, the lower sealing end seals the material feeding hole.

A material-carrying groove is formed between the lower sealing end and the middle limiting rod, and the material-carrying groove is configured to convey the material from inside of the salt hopper main body to outside of the salt hopper main body.

In optional embodiments, a putting mechanism is further comprised, wherein the putting mechanism comprises a robotic arm component, a gripper, and a finger component. The robotic arm component is arranged on the frame body, the gripper is arranged at an end of the robotic arm component, the finger component is arranged on the gripper, and the finger component is configured to grip the paper box.

In optional embodiments, a finished product rack component is further comprised, wherein the putting mechanism places the paper box from the paper box rotation mechanism onto the finished product rack component.

The finished product rack component comprises a finished product shelf, a finished product support bracket, and a third sensor component, wherein the finished product shelf is provided with at least one placement groove. A first end of the placement groove is arranged with the third sensor component, and the putting mechanism places the paper box at a second end of the placement groove. A height of the first end is lower than a height of the second end.

The finished product support bracket is arranged on the frame body.

In optional embodiments, an angle between a line connecting the first end and the second end and a horizontal plane is $\alpha$, wherein $2°\leq\alpha\leq7°$.

The lifting mechanism of the box-taking mechanism of the fries box-packing machine provided by the present disclosure can elevate the rotating mounting frame, thereby adjusting the height of the suction cup assembly. This allows the suction cup assembly to move the paper box from the upper end of the upper mounting plate to the lower end of the upper mounting plate. When the suction cup assembly attaches to the paper box, the lifting mechanism separates the paper box from the box storage component. Additionally, through the rotator, the suction cup assembly rotates, causing the paper box to rotate and enabling the opening of the paper box to face upwards; therefore, the retrieval of the box is completed. In other words, the box-taking mechanism can move the paper box from the box storage component arranged at a higher location to the lower end of the lower mounting plate, thus facilitating the retrieval of the paper box and improving the efficiency of packing fries into the paper box.

BRIEF DESCRIPTION OF DRAWINGS

In order to more clearly illustrate the specific embodiments of the present invention or the technical solution in the prior art, the drawings required to be used in the description of the specific embodiment or prior art will be briefly introduced as follows. Obviously, the drawings described below are some embodiments of the present disclosure, for those of ordinary skill in the art, without paying creative labor, may also obtain other drawings according to these drawings.

REFERENCE NUMERALS

Figure 1:
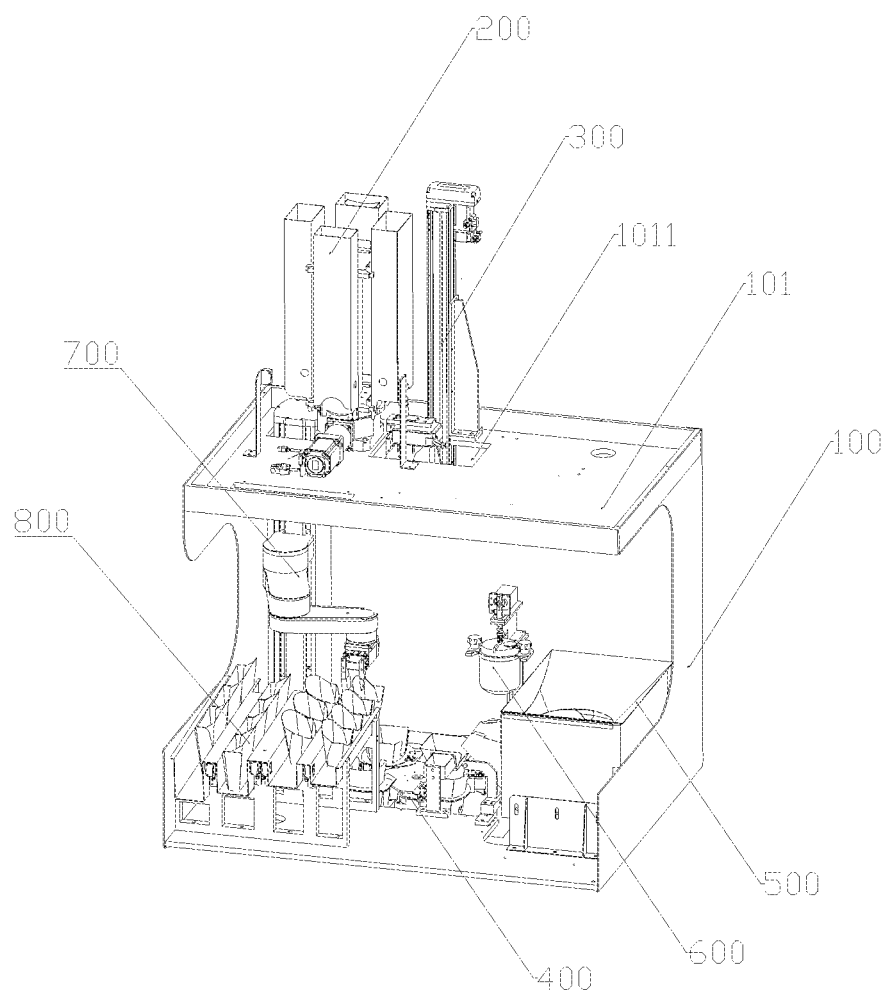
FIG. 1 is a structural schematic diagram of a fries box-packing machine provided in the embodiments of the present disclosure.
Figure 2:
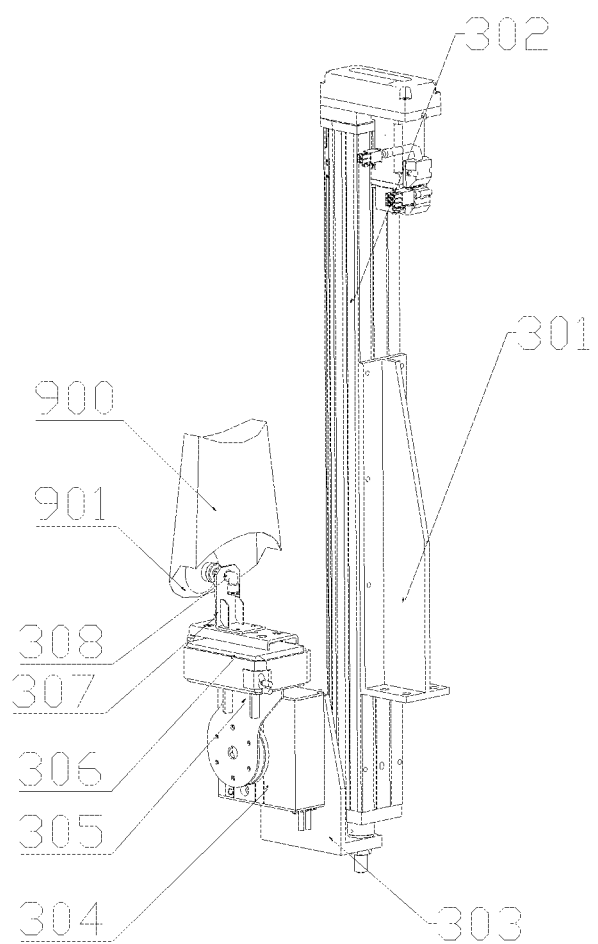
FIG. 2 is a structural schematic diagram of a box-taking mechanism of the fries box-packing machine shown in FIG. 1.
Figure 3:
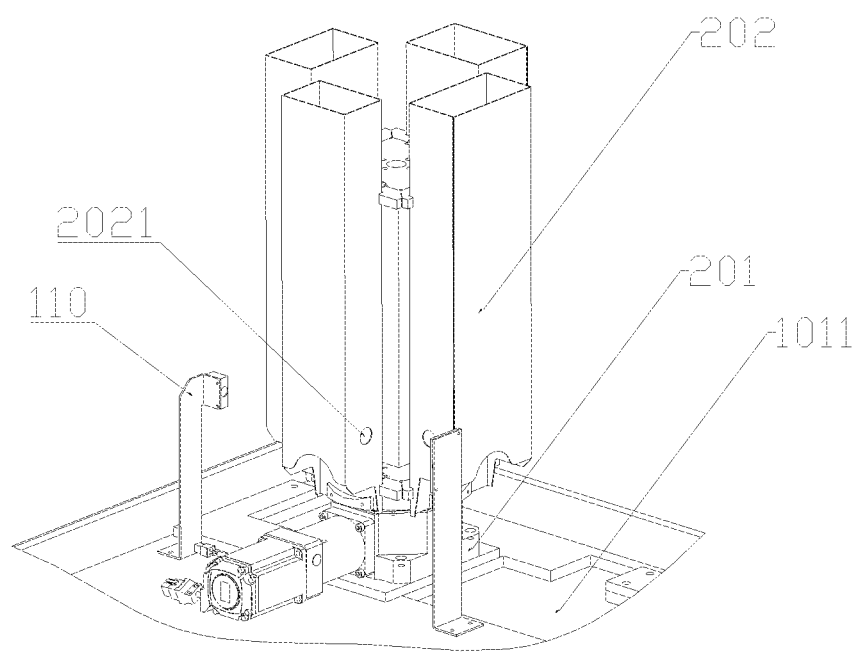
FIG. 3 is a structural schematic diagram of the box storage component of the fries box-packing machine shown in FIG. 1 mounted on an upper mounting plate.
Figure 4:
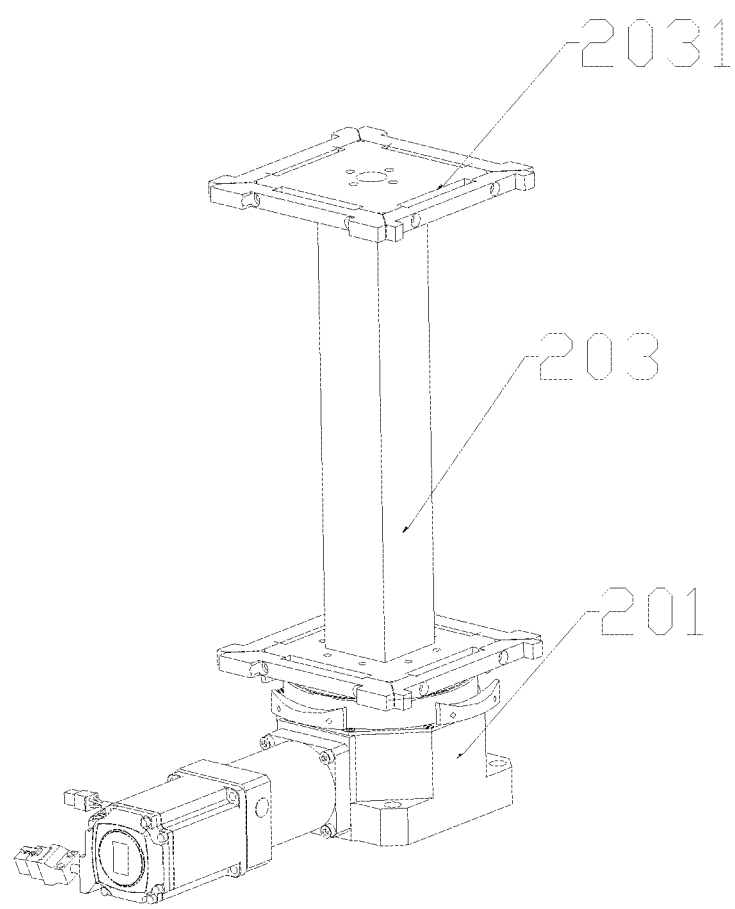
FIG. 4 is a structural schematic diagram of a rotating power mechanism of the box storage component shown in FIG. 3 connected to the rotating bracket.
Figure 5:
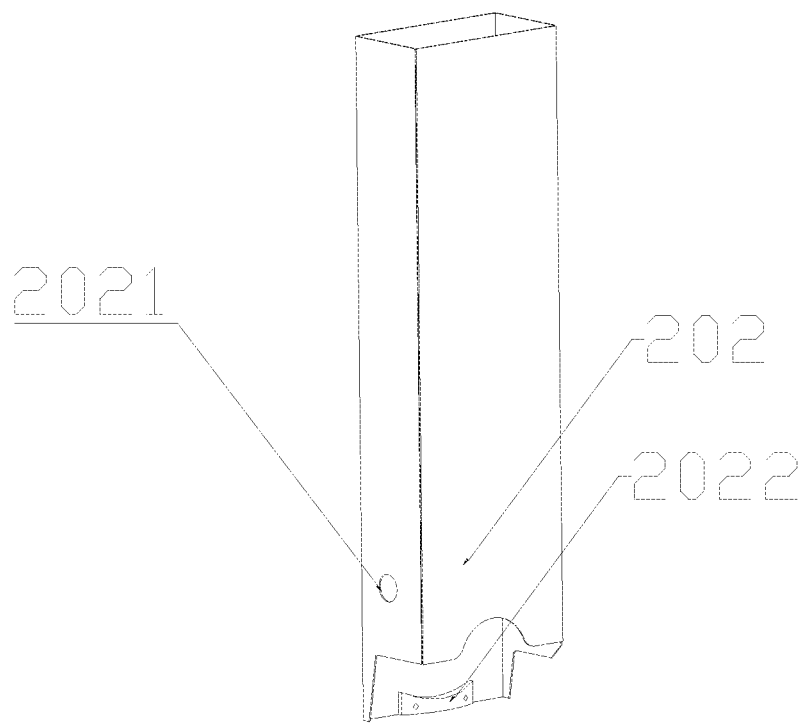
FIG. 5 is a structural schematic diagram of a box cylinder of the box storage component shown in FIG. 3.
Figure 6:
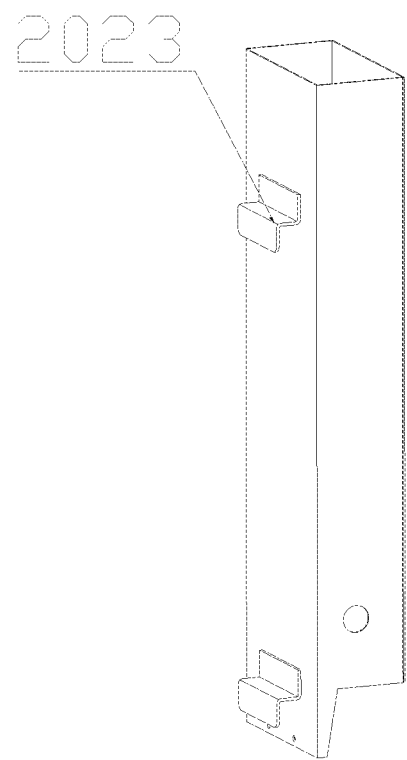
FIG. 6 is a structural schematic diagram of another angle of the box cylinder shown in FIG. 5.
Figure 7:
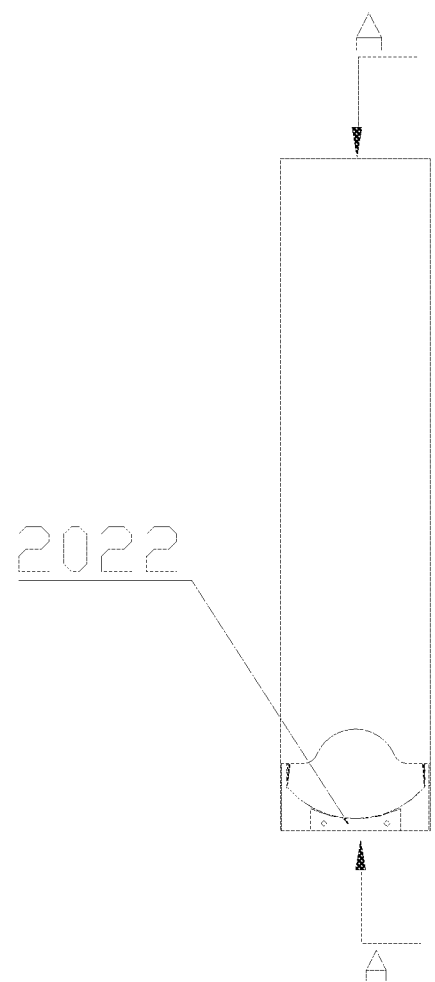
FIG. 7 is a structural schematic diagram of the box cylinder of the box storage component shown in FIG. 3 assembled with a paper box.
Figure 8:
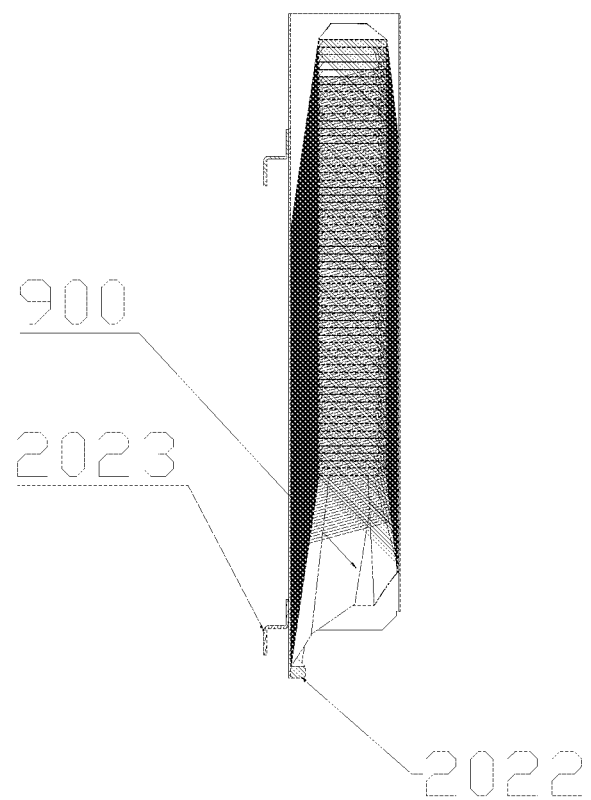
FIG. 8 is a schematic A-A sectional structural diagram of the box cylinder assembled with a paper box shown in FIG. 7.
Figure 9:
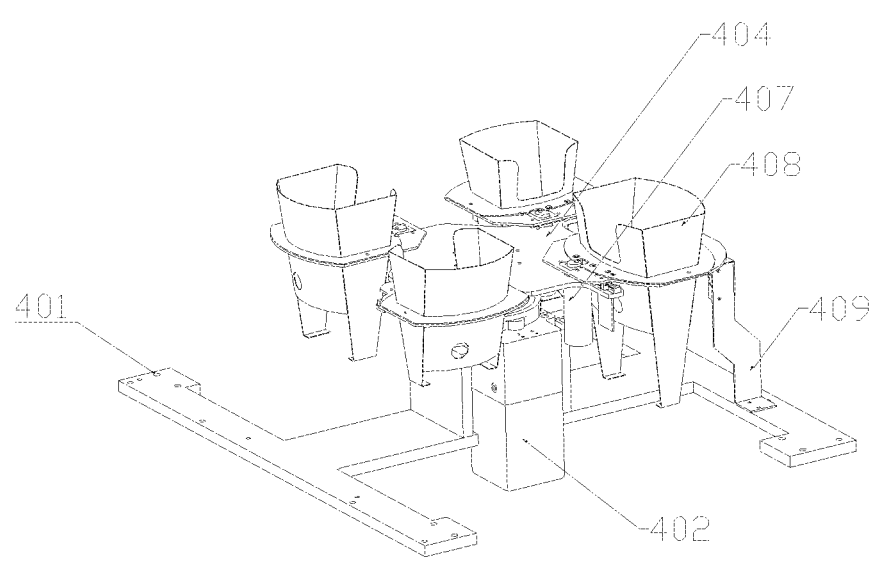
FIG. 9 is a structural schematic diagram of a paper box rotation mechanism of the fries box-packing machine shown in FIG. 1.
Figure 10:
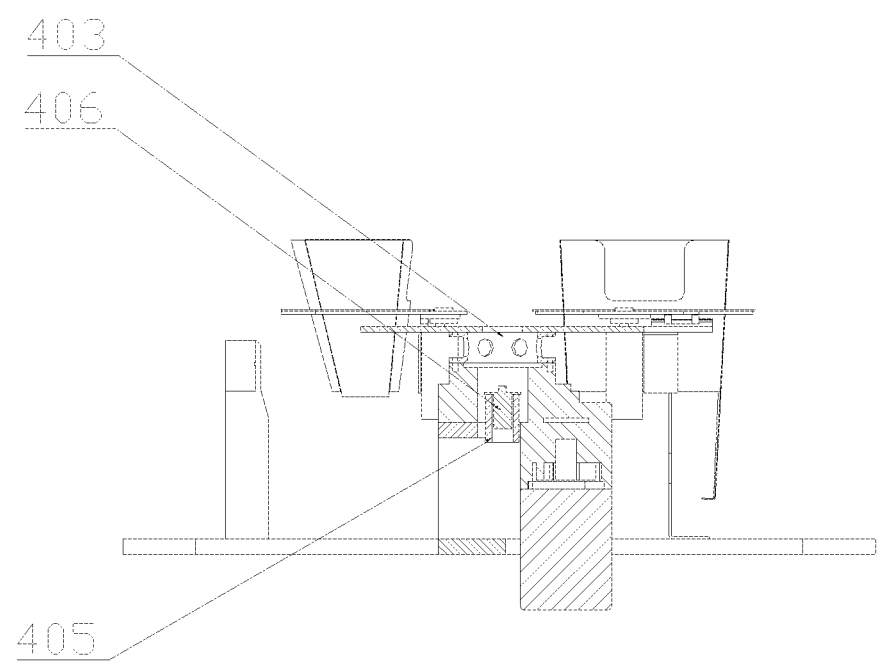
FIG. 10 is a structural schematic diagram of a longitudinal section of the paper box rotation mechanism shown in FIG. 9.
Figure 11:
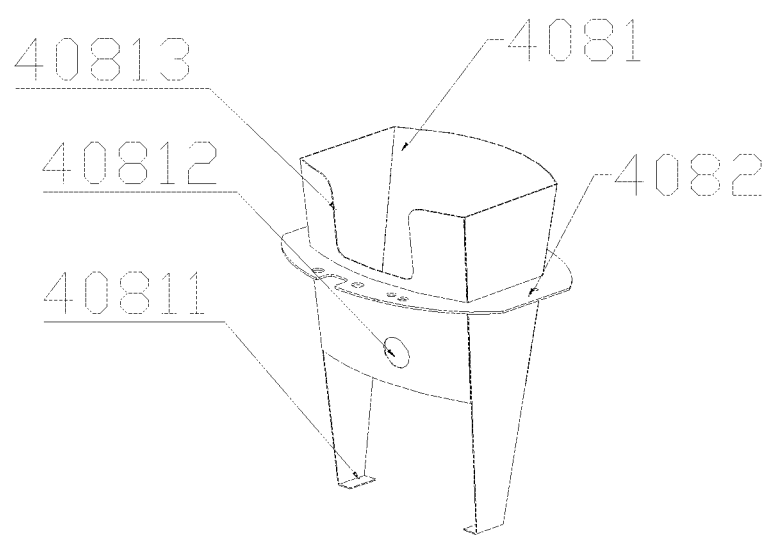
FIG. 11 is a structural schematic diagram of a box-holding component of the paper box rotation mechanism shown in FIG. 9.
Figure 12:
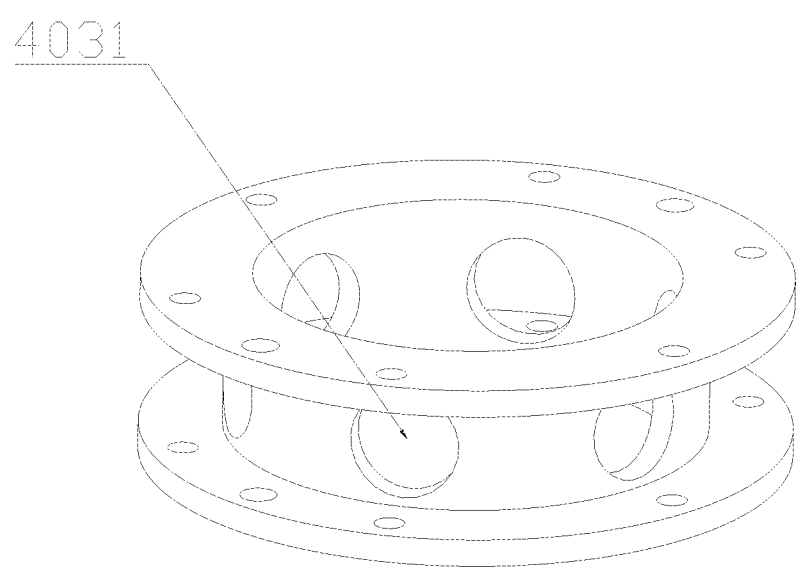
FIG. 12 is a structural schematic diagram of a transition sleeve of the longitudinal section of the paper box rotation mechanism shown in FIG. 10.

100—frame body; 101—upper mounting plate; 1011—box-taking assembly opening; 200—box storage component; 201—rotating power mechanism; 202—box cylinder; 2021—through hole; 2022—lower limit baffle; 2023—plug-in component; 203—rotating bracket; 2031—insertion slot; 300—box-taking mechanism; 301—mounting bracket; 302—lifting mechanism; 303—rotating mounting frame; 304—rotator; 305—pushing bracket; 306—pusher; 307—suction cup bracket; 308—suction cup assembly; 400—paper box rotation mechanism; 401—connecting bracket; 402—rotation driver; 403—transition sleeve; 4031—wire through-hole; 404—rotating disc; 405—slip ring base; 406—slip ring; 407—shaking mechanism; 4071—shaking motor; 4072—box-holding mounting plate; 4073—second sliding groove; 4074—swing rod; 4075—limit component; 40751—lateral opening; 4076—first sliding component; 408—box-holding component; 4081—box-holding main body; 40811—lower support protrusion; 40812—detection hole; 40813—first notch; 4082—holding hoop; 409—second sensor component; 500—weighing and packing mechanism; 501—large funnel component; 5011—large funnel; 5012—large funnel bracket; 502—vibrating tray; 503—packing component; 5031—material box; 5032—material box bracket; 5033—packing mounting plate; 50331—third sliding groove; 5034—weighing support bracket; 5035—packing rotation motor; 5036—packing motor; 5037—weighing sensor; 5038—second sliding component; 504—small funnel component; 5041—small funnel; 5042—small funnel bracket; 600—seasoning mechanism; 601—seasoning bracket; 602—salt hopper component; 6021—salt hopper main body; 6022—salt hopper cover; 6023—material feeding rod; 60231—upper guiding rod; 60232—middle limiting rod; 60233—material-carrying groove; 60234—lower sealing end; 6024—reset spring; 6025—limit nut; 603—power component; 6031—seasoning motor; 6032—drive plate; 6033—fourth sliding groove; 6034—beating rod; 6035—drive bracket; 6036—third sliding component; 700—putting mechanism; 701—robotic arm component; 702—gripper; 703—finger component; 800—finished product rack component; 801—finished product support bracket; 802—placement groove; 803—finished product shelf; 804—third sensor component; 900—paper box; 901—flange; 110—first sensor component.

DETAILED DESCRIPTION OF EMBODIMENTS

The terms "first", "second", "third", etc. are used only to distinguish descriptions and do not indicate sequential numbering, nor are they to be understood as indicating or implying relative importance.

In addition, the terms, "horizontal", "vertical" and "overhang" do not mean that elements are required to be absolutely horizontal or overhanging, but can be slightly inclined. For example, "horizontal" only means that its direction is more horizontal than "vertical", and it does not mean that the structure must be completely horizontal, but can be slightly inclined.

In the description of the present disclosure, it should be noted that the orientation or position relationships indicated by the terms "inside", "outside", "left", "right", "up", "down", etc. are the orientation or position relationships shown based on the attached drawings or the orientation or position relationships customarily placed in the use of the product of the present disclosure. It is only for the convenience of describing the present disclosure and simplifying its description and does not indicate or imply that the device or element referred to must be in a specific orientation or be constructed and operated in a specific orientation, and thus should not be construed as limiting the present disclosure.

In the description of the present disclosure, unless otherwise clearly stipulated and limited, the terms "provide", "mount", "link" and "connect" should be understood in a broad sense, for example, it can be a fixed connection, a detachable connection, or an integral connection; it can be a mechanical connection or an electrical connection; and it can be a direct connection, an indirect connection through an intermediary, or an internal communication between two components.

The technical solutions of the present disclosure will be clearly and completely described below in conjunction with the drawings.

Referring to FIGS. 1 to 38, the present disclosure provides a fries box-packing machine, comprising a frame body 100, a box storage component 200, and a box-taking mechanism 300, wherein the frame body 100 is provided thereon with an upper mounting plate 101, the box storage component 200 is arranged on an upper end surface of the upper mounting plate 101, the box-taking mechanism 300 is arranged on the upper mounting plate 101, and the box-taking mechanism 300 is configured to sequentially move a paper box 900 of the box storage component 200 to below the upper mounting plate 101.

The upper mounting plate 101 is provided thereon with a box-taking assembly opening 1011. The box-taking mechanism 300 comprises a mounting bracket 301, a lifting mechanism 302, and a pusher 306.

The mounting bracket 301 is arranged on the upper mounting plate 101, and the lifting mechanism 302 passes through the box-taking assembly opening 1011. A movable end of the lifting mechanism 302 is provided with a rotating mounting frame 303, and the rotating mounting frame 303 is provided thereon with a rotator 304. The rotator 304 is provided thereon with a pushing bracket 305.

The pusher 306 is arranged on the pushing bracket 305, and a movable end of the pusher 306 is provided with a suction cup bracket 307. The suction cup assembly 308 is arranged on the suction cup bracket 307, and the suction cup assembly 308 is configured to suction the paper box 900.

In some embodiments, the box storage component 200 and the box-taking mechanism 300 are both arranged on the frame body 100. The box storage component 200 is arranged at the upper end of the upper mounting plate 101, and the box-taking mechanism 300 is assembled at the box-taking assembly opening 1011.

The mounting bracket 301 is arranged on one side of the box-taking assembly opening 1011. The lifting mechanism 302 is securely arranged on the mounting bracket 301. Typically, the lifting mechanism 302 can be a push rod. A rotating mounting frame 303 is arranged at the movable end of the lifting mechanism 302. The rotator 304 is assembled on the rotating mounting frame 303. The rotator 304 can be a motor. The pushing bracket 305 is arranged on the rotator 304, and the rotator 304 enables the pushing bracket 305 to rotate.

A pusher 306 is arranged on the pushing bracket 305, wherein the pusher 306 can be a cylinder. The pusher 306 is capable of causing the suction cup assembly 308, arranged on the pusher 306, to perform telescopic movements.

The suction cup assembly 308 generally includes an air pipe elbow, a suction cup bracket 307, and a suction cup. The suction cup bracket 307 is arranged on the pushing bracket 305, the air pipe elbow is arranged on the suction cup bracket 307, and the suction cup is arranged on the air pipe elbow.

Referring to FIGS. 3 to 8, in optional embodiments, the box storage component 200 comprises a rotating power mechanism 201, a rotating bracket 203, and multiple box cylinders 202 arranged on the rotating bracket 203.

The rotating bracket 203 is arranged on the rotating power mechanism 201, wherein the rotating power mechanism 201 enables the rotating bracket 203 to rotate. The multiple box cylinders 202 are arranged on the rotating bracket 203. The box cylinders 202 are evenly arranged along a circumference of the rotating bracket 203.

Each box cylinder 202 is provided with a plug-in component 2023, and an insertion slot 2031 matching the plug-in component 2023 is arranged on the rotating bracket 203. A through hole 2021 is provided on the box cylinder 202 along the horizontal direction. A first sensor component 110 is arranged on the upper mounting plate 101. The first sensor component 110 detects whether there is a paper box 900 inside the box cylinder 202 through the through hole 2021.

The box cylinder 202 is provided therein with a lower limit baffle 2022. The multiple paper boxes 900 are assembled inside the box cylinder 202, openings of the paper boxes 900 face downward, and a bottommost paper box 900 abuts against the lower limit baffle 2022. The lower limit baffle 2022 is configured to prevent the paper boxes 900 from detaching from the box cylinder 202 at a lower end of the box cylinder 202.

At least one of the box cylinders 202 has its lower opening facing the box-taking assembly opening 1011, and the suction cup assembly 308 is configured to suction the paper box 900 from inside of the box cylinder 202.

The rotating power mechanism 201 of the box storage component 200 is provided with a rotating bracket 203. Typically, four box cylinders 202 are arranged on the rotating bracket 203. Multiple stacked paper boxes 900 are arranged inside the box cylinder 202, and the openings of the paper boxes 900 are facing downward.

To prevent the paper box 900 from falling out from the bottom of the box cylinder 202, a lower limit baffle 2022 is arranged inside the box cylinder 202. The lower limit baffle 2022 abuts against the paper box 900, thus preventing the paper box 900 from moving further downward. When it is necessary to move the paper box 900 out of the box cylinder 202, the suction cup assembly 308 attaches to the bottommost paper box 900 inside the box cylinder 202. The pusher 306 moves the paper box 900 towards the pusher, thereby causing the lower end of the paper box 900 to disengage from the lower limit baffle 2022.

Referring to FIGS. 15 to 20, since the flange 901 of the second-to-last paper box 900 from the bottom is not suctioned, and the second-to-last paper box 900 from the bottom does not deform, the flange 901 of the second-to-last paper box 900 from the bottom rests on the lower limit baffle 2022. The second-to-last paper box 900 from the bottom and any paper boxes 900 above it will not fall out. The suction cup assembly 308, carrying the paper box 900, moves downward by the lifting mechanism 302. After the bottom of the paper box 900 detaches from the box cylinder 202, the paper box 900 can descend driven by the lifting mechanism 302. That is, the lifting mechanism 302 moves the paper box 900 from the box-taking assembly opening 1011 to the lower end of the upper mounting plate 101. At this point, the rotator 304 enables the rotating mounting frame 303 to rotate, which causes the paper box 900 to flip 180° so that the opening of the paper box 900 faces up.

The rotating bracket 203 is arranged with an insertion slot 2031, and a plug-in component 2023 is arranged on the box cylinder 202. Generally, two plug-in components 2023 are provided on the box cylinder 202. The insertion slot 2031 corresponding to the plug-in component 2023 is arranged on the rotating bracket 203. The plug-in component 2023 is inserted into the insertion slot 2031, thus achieving the assembly of the box cylinder 202 on the rotating bracket 203.

A through hole 2021 is arranged on the box cylinder 202. The first sensor component 110 generally includes an infrared receiver and an infrared emitter. When there is no paper box 900 inside the box cylinder 202, the infrared emitted by the infrared emitter can be received by the infrared receiver. At this time, there is no paper box 900 inside the paper box 202.

Usually, only one first sensor component 110 detects one box cylinder 202 of multiple box cylinders 202. When the first sensor component 110 detects that there is no paper box 900 inside the box cylinder 202, multiple empty box cylinders 202 need to be successively filled with paper boxes 900.

Referring to FIGS. 9 to 12, and 29, in optional embodiments, a paper box rotation mechanism 400 and a weighing and packing mechanism 500 are further comprised, wherein the weighing and packing mechanism 500 is configured to load the fries based on weight into the paper box 900 of the paper box rotation mechanism 400.

The paper box rotation mechanism 400 comprises a connecting bracket 401, a rotation driver 402, and a rotating disc 404, wherein the connecting bracket 401 is arranged on the frame body 100. The rotation driver 402 is arranged on the connecting bracket 401, and the rotating disc 404 is rotationally arranged on the rotation driver 402.

Multiple shaking mechanisms 407 are arranged on the rotating disc 404, wherein each shaking mechanism 407 is provided with a box-holding component 408 and each box-holding component 408 is provided with a second sensor component 409.

The box-holding component 408 is configured to place the paper box 900, and the second sensor component 409 is configured to detect whether there is a paper box 900 inside the box-holding component 408.

In some embodiments, the paper box rotation mechanism 400 is configured to place the paper box 900 taken down by the box-taking mechanism 300, and the weighing and packing mechanism 500 is configured to load the fries into the paper box 900 of the paper box rotation mechanism 400.

The rotation driver 402 is typically an electric motor, wherein the rotation driver 402 enables the rotating disc 404 to rotate. Multiple shaking mechanisms 407 are arranged on the rotation disc 404, with each shaking mechanism 407 corresponding to a box-holding component 408. The box-holding component 408 is configured to assemble the paper box 900.

When the second sensor component 409 detects whether there is a paper box 900 inside the box-holding component 408, it ensures that when the rotation driver 402 moves the box-holding component 408 on the rotating disc 404 to the corresponding position of the weighing and packing mechanism 500, there is a paper box 900 inside the box-holding component 408.

The shaking mechanism 407 is configured to shake the box-holding component 408, thereby allowing the fries to be better placed into the paper box 900.

In optional embodiments, a lower end surface of the rotating disc 404 is provided with a transition sleeve 403. A lower end of the transition sleeve 403 is provided with a slip ring 406 and a slip ring base 405, wherein the slip ring 406 is arranged on the slip ring base 405. The slip ring base 405 is configured to connect with a power supply device, and the slip ring 406 is configured to connect with the shaking mechanism 407.

The transition sleeve 403 is provided thereon with a wire through-hole 4031, and each shaking mechanism 407 corresponds to a wire through-hole 4031.

As the shaking mechanism 407 is arranged on the rotating disc 404, to enable the shaking mechanism 407 to connect to the power supply device, a transition sleeve 403 is arranged on the rotating disc 404. The transition sleeve 403 is arranged with a wire through-hole 4031 through which the connecting wire connecting the shaking mechanism 407 and the slip ring 406 passes.

The slip ring 406 is rotationally arranged on the slip ring base 405. The slip ring base 405 is connected to the power supply device, and the slip ring 406 is connected to the slip ring base 405, thereby achieving the connection between the power supply device and the shaking mechanism 407.

Figure 13:
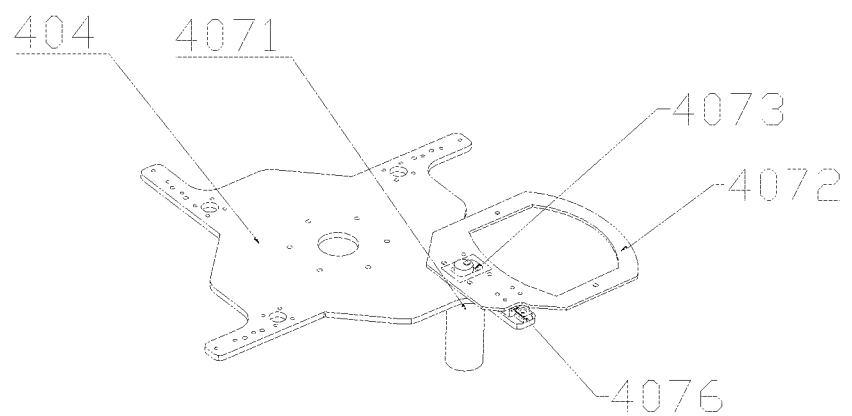
FIG. 13 is a structural schematic diagram of a shaking mechanism of the paper box rotation mechanism shown in FIG. 9.

Referring to FIG. 13, in optional embodiments, the shaking mechanism 407 comprises a shaking motor 4071, an eccentric wheel, and a box-holding mounting plate 4072. The shaking motor 4071 is mounted on the rotating disc 404, and the eccentric wheel is arranged at an output end of the shaking motor 4071.

The box-holding mounting plate 4072 is arranged on the rotating disc 404, and a first sliding component 4076 is arranged between the box-holding mounting plate 4072 and the rotating disc 404.

The box-holding mounting plate 4072 is provided thereon with a first sliding groove, and the eccentric wheel is arranged inside the first sliding groove. The eccentric wheel enables the box-holding mounting plate 4072 to move back and forth in a direction restricted by the first sliding component 4076.

The shaking motor 4071 can enable the eccentric wheel to rotate, wherein the eccentric wheel passes through the first sliding groove. Through the rotation of the eccentric wheel, the box-holding mounting plate 4072 moves back and forth in one direction. The first sliding component 4076 restricts the movement of the box-holding mounting plate 4072 in one direction, thereby achieving the shaking of the paper box 900.

Figure 14:
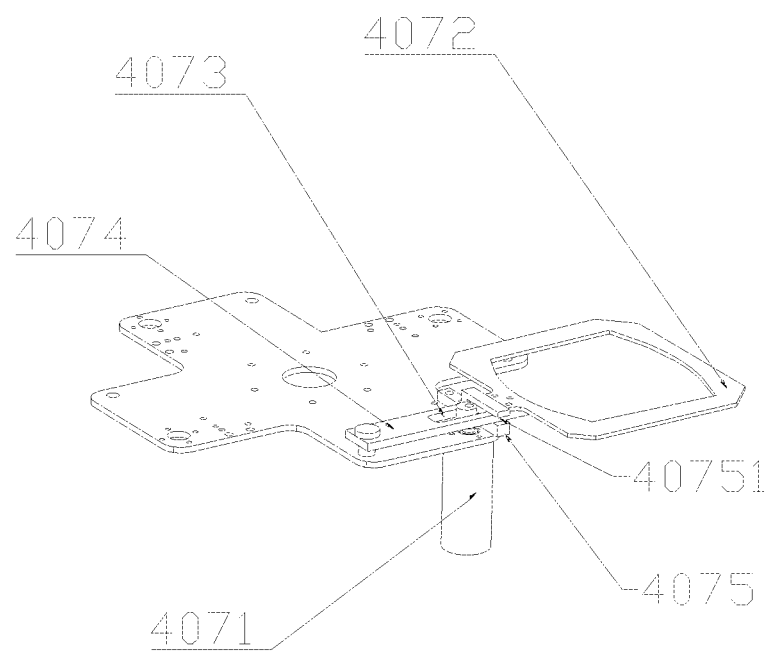
FIG. 14 is a structural schematic diagram of another structure of the shaking mechanism of the paper box rotation mechanism shown in FIG. 9.
Figure 15:
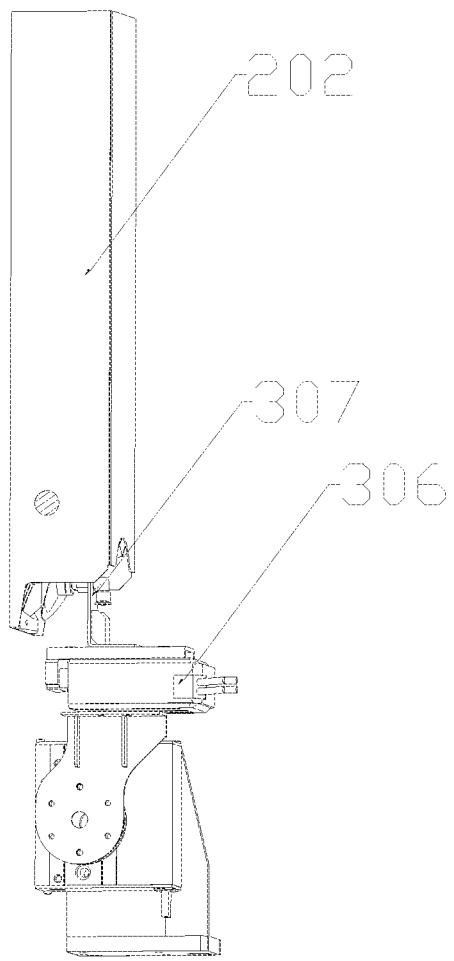
FIG. 15 is a structural schematic diagram of a state of use of the box-taking mechanism of the fries box-packing machine shown in FIG. 1 for picking up a box from a box cylinder.
Figure 16:
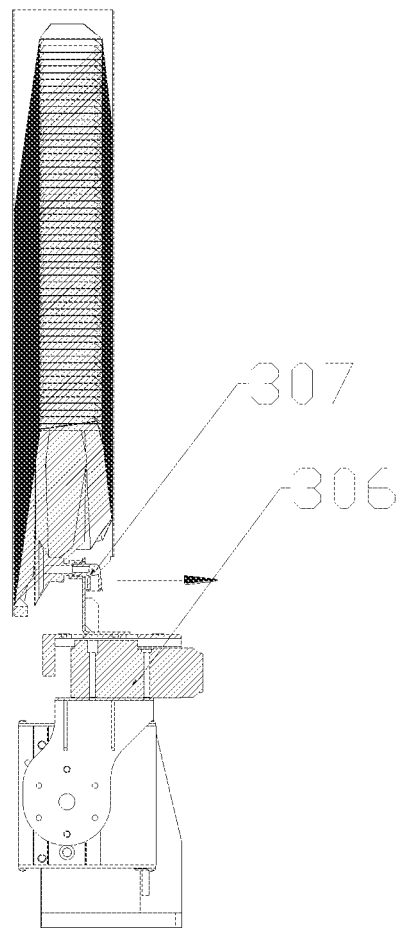
FIG. 16 is a structural schematic diagram of a longitudinal cross-section of a state of use of the box-taking mechanism of the fries box-packing machine shown in FIG. 1 for picking a box from the box cylinder.
Figure 17:
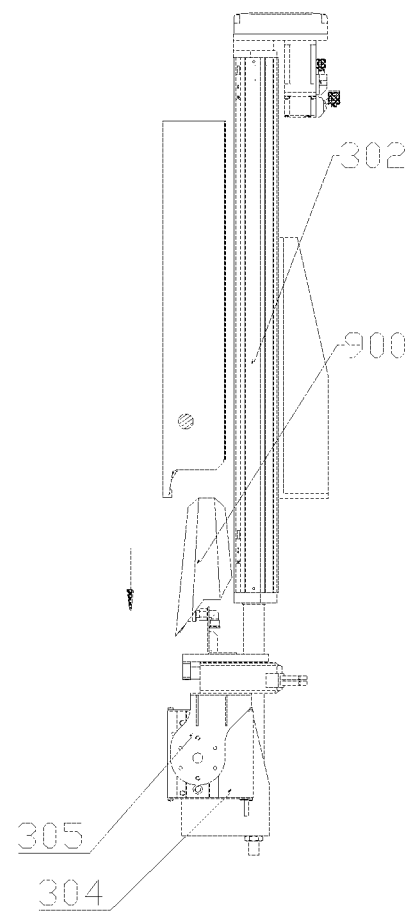
FIG. 17 is a structural schematic diagram of a state of use of the box-taking mechanism of the fries box-packing machine shown in FIG. 1 for picking up a paper box from the box cylinder.
Figure 18:
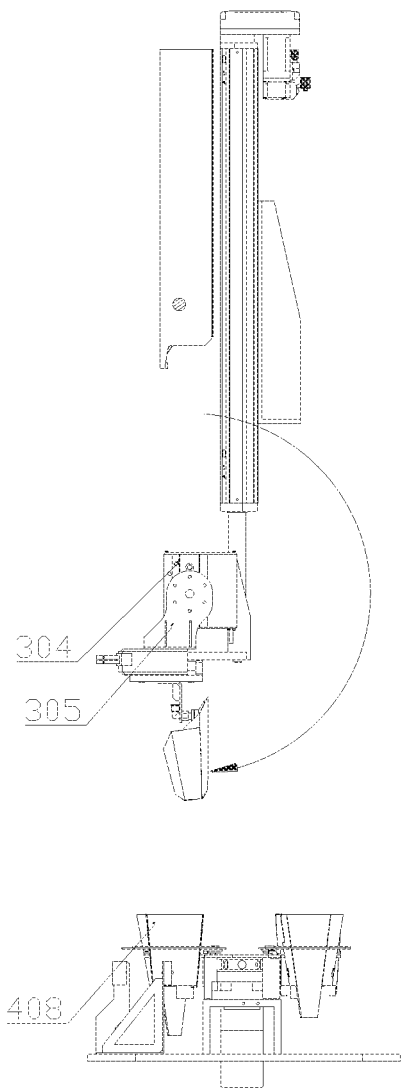
FIG. 18 is a structural schematic diagram of another state of use of the box-taking mechanism of the fries box-packing machine shown in FIG. 1 for picking up a paper box from the box cylinder.
Figure 19:
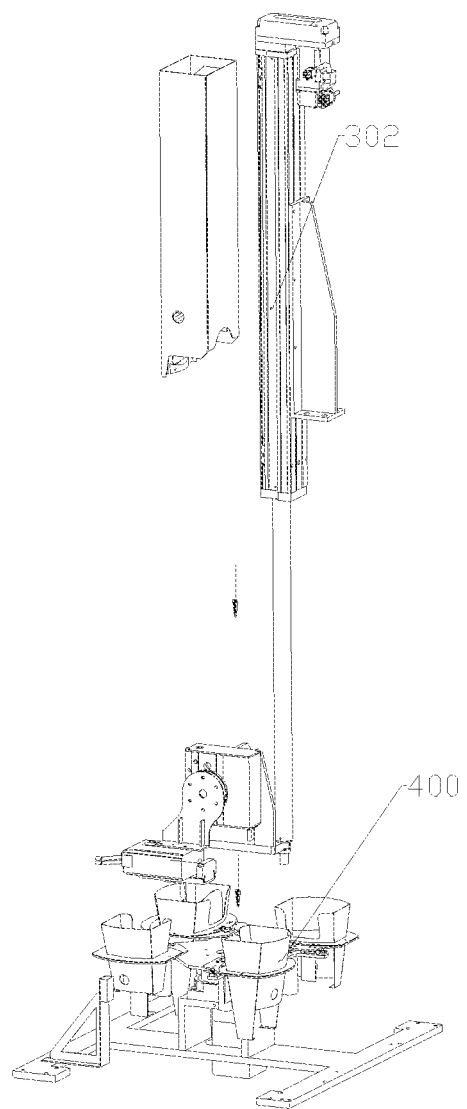
FIG. 19 is a structural schematic diagram of a state of use of the box-taking mechanism of the fries box-packing machine shown in FIG. 1 inserting a paper box into the paper box rotation mechanism.
Figure 20:
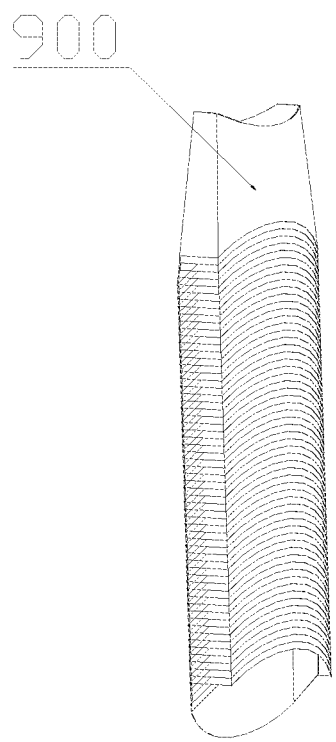
FIG. 20 is a structural schematic diagram of stacked paper boxes within the box cylinder of the fries box-packing machine in FIG. 1; the paper box rotation mechanism.
Figure 21:
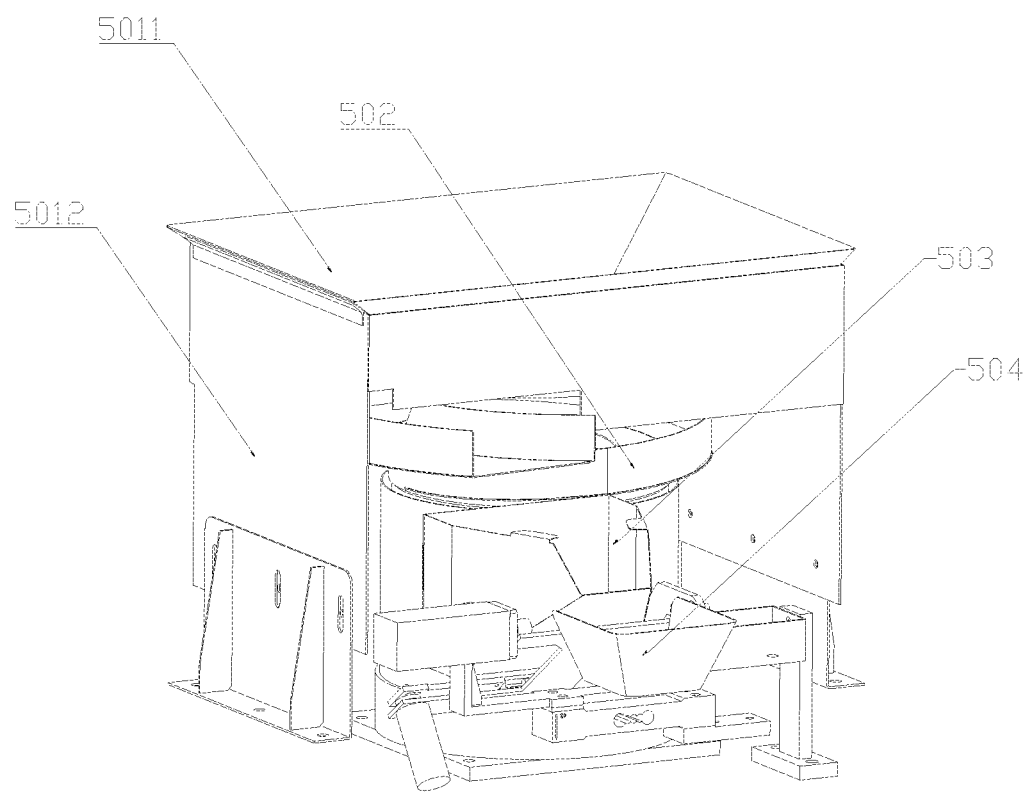
FIG. 21 is a structural schematic diagram of a weighing and packing mechanism of the fries box-packing machine shown in FIG. 1.
Figure 22:
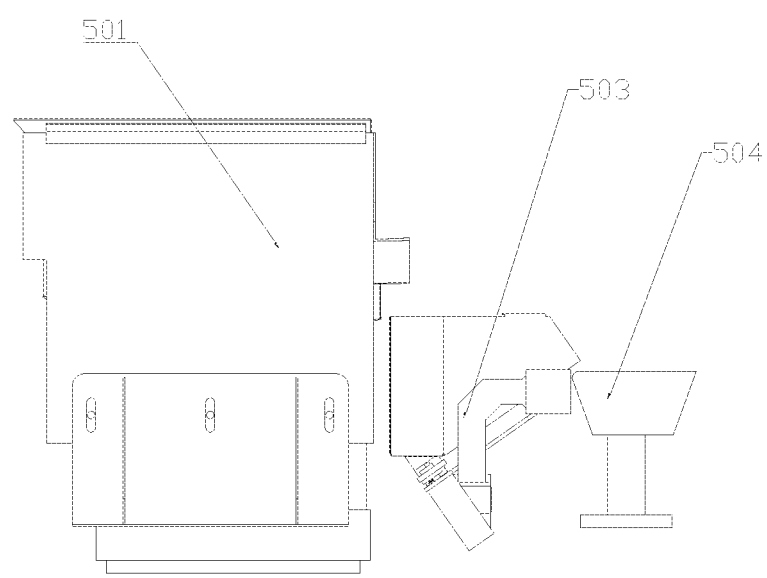
FIG. 22 is a structural schematic diagram of the weighing and packing mechanism from another angle shown in FIG. 21.
Figure 23:
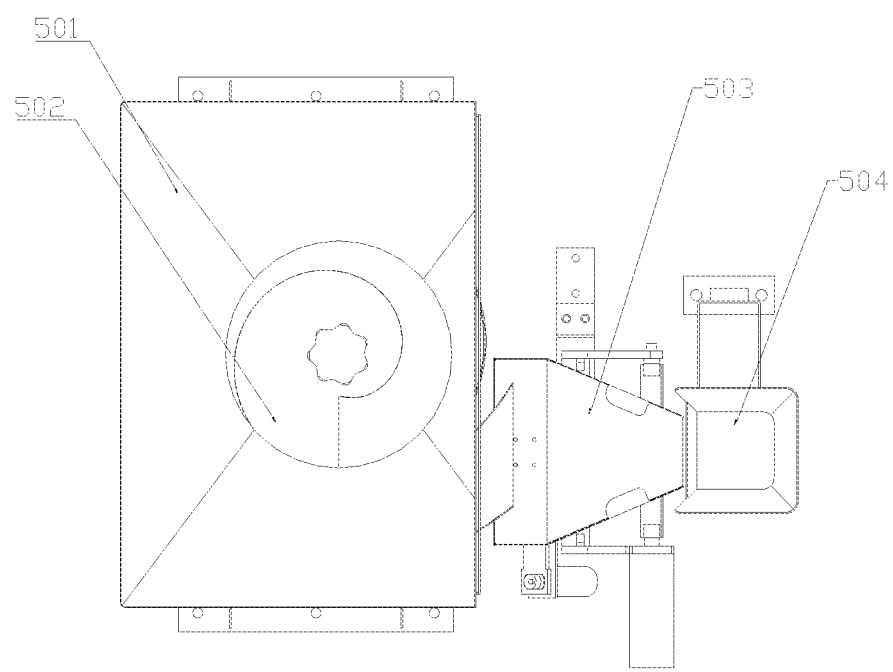
FIG. 23 is a structural schematic diagram of the weighing and packing mechanism from another angle shown in FIG. 22.
Figure 24:
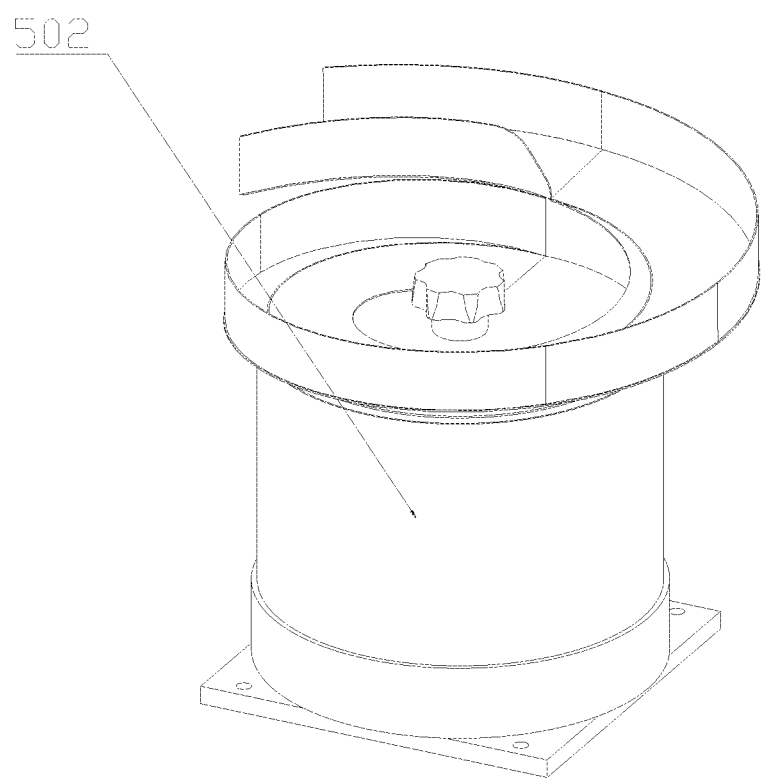
FIG. 24 is a structural schematic diagram of a vibrating tray of the weighing and packing mechanism shown in FIG. 22.
Figure 25:
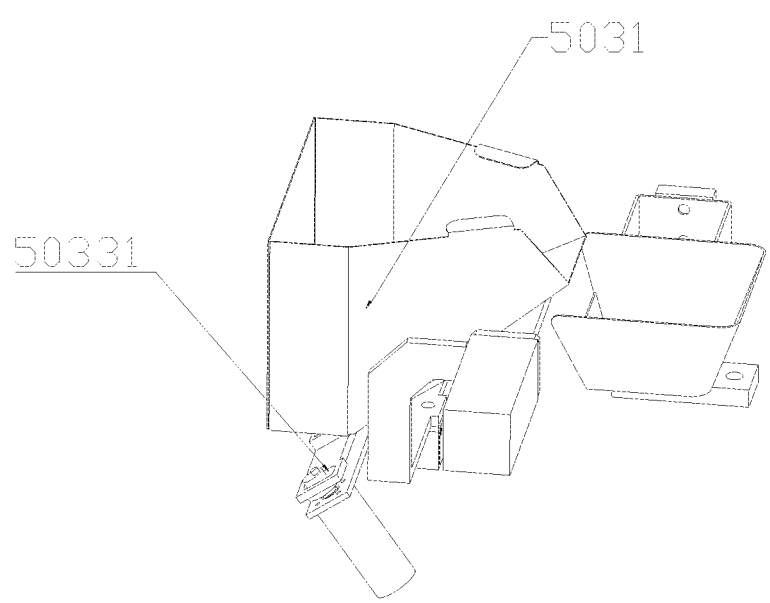
FIG. 25 is a structural schematic diagram of a packing component of the weighing and packing mechanism shown in FIG. 22.
Figure 26:
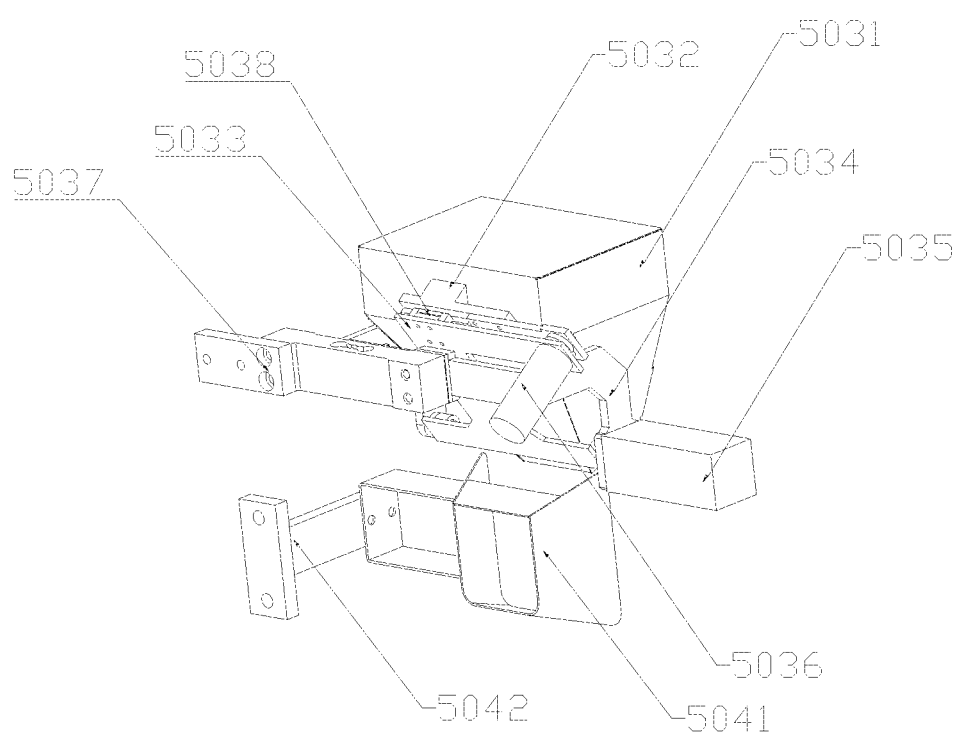
FIG. 26 is a structural schematic view of another angle of the packing component shown in FIG. 25.
Figure 27:
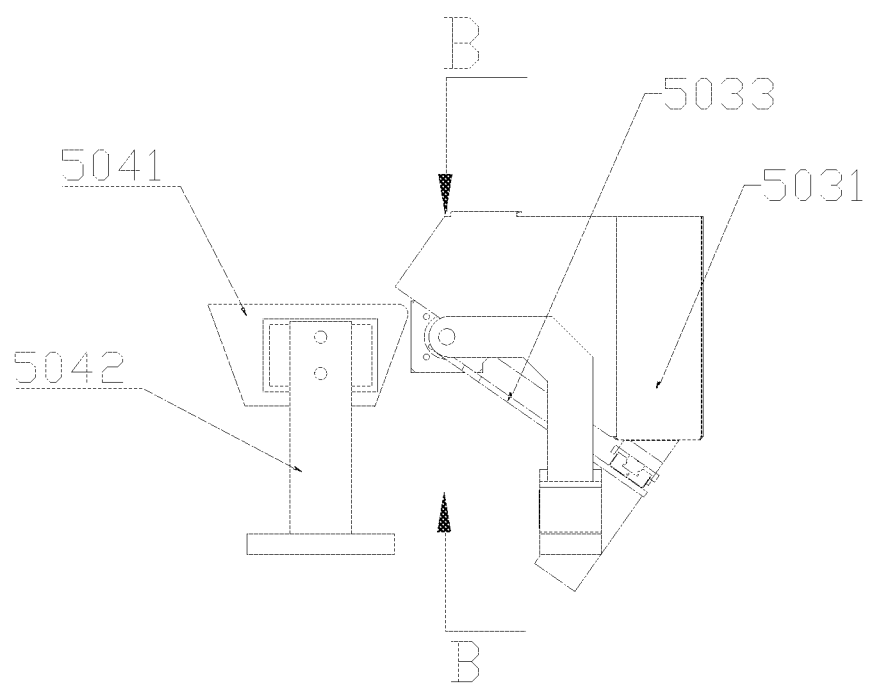
FIG. 27 is a structural schematic view of another angle of the packing component shown in FIG. 25.
Figure 28:
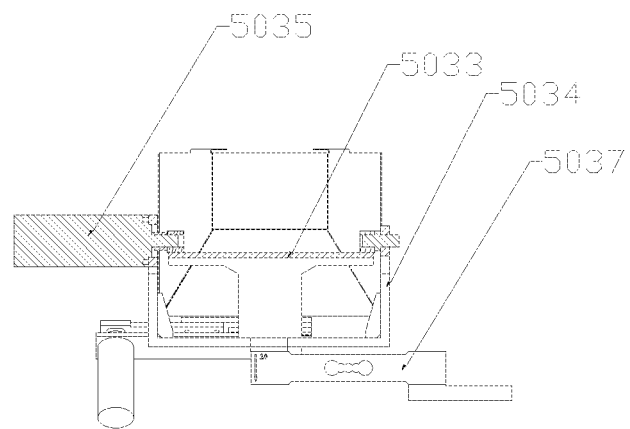
FIG. 28 is a structural schematic view of a B-B section of the packing component shown in FIG. 27.
Figure 29:
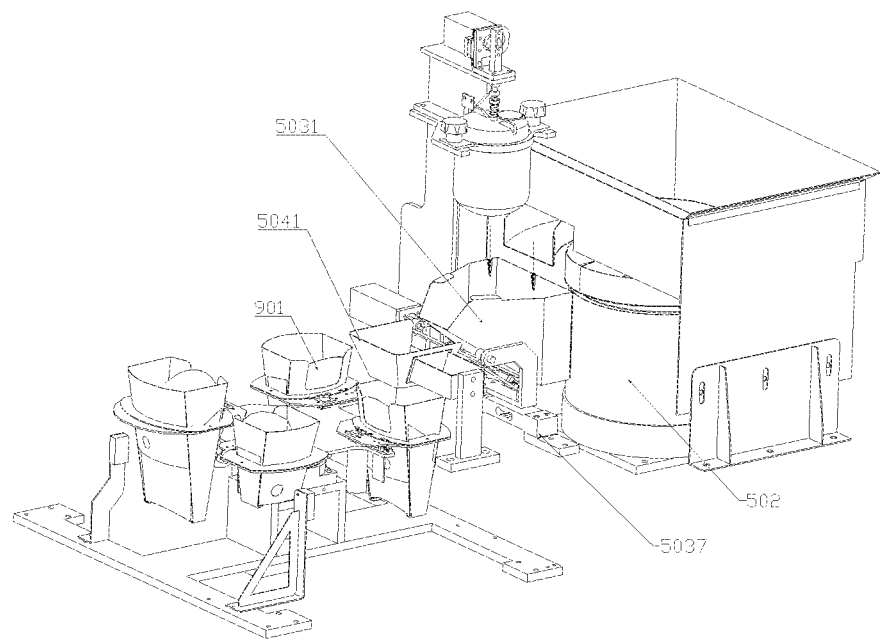
FIG. 29 is a schematic diagram of a positional relationship of the seasoning mechanism, the weighing and packing mechanism, and the paper box rotation mechanism of the fries box-packing machine shown in FIG. 1.
Figure 30:
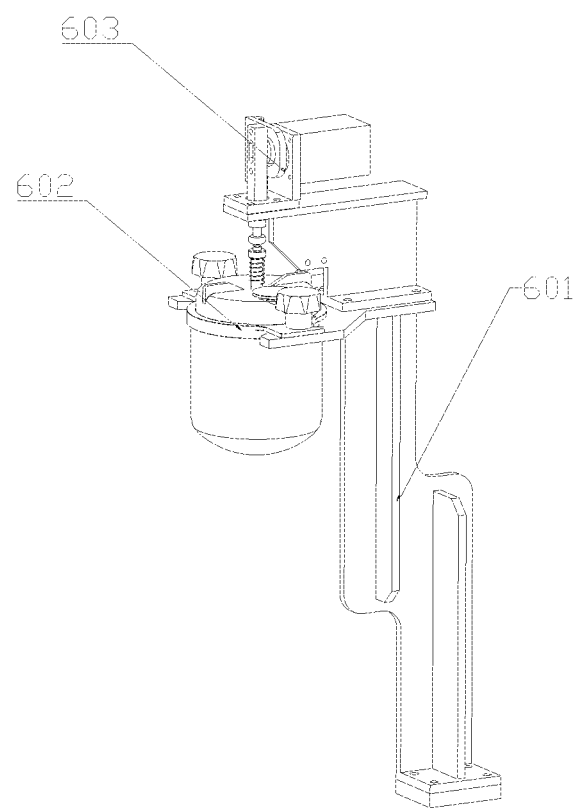
FIG. 30 is a structural schematic diagram of a seasoning mechanism of the fries box-packing machine shown in FIG. 1.
Figure 31:
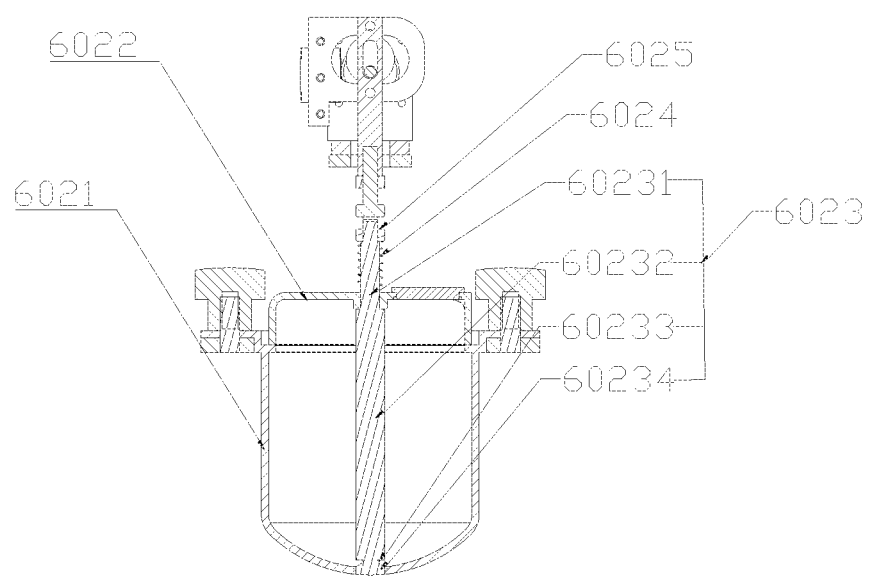
FIG. 31 is a structural schematic diagram of a longitudinal section of the salt hopper component of the seasoning mechanism shown in FIG. 31 connected to the power component.
Figure 32:
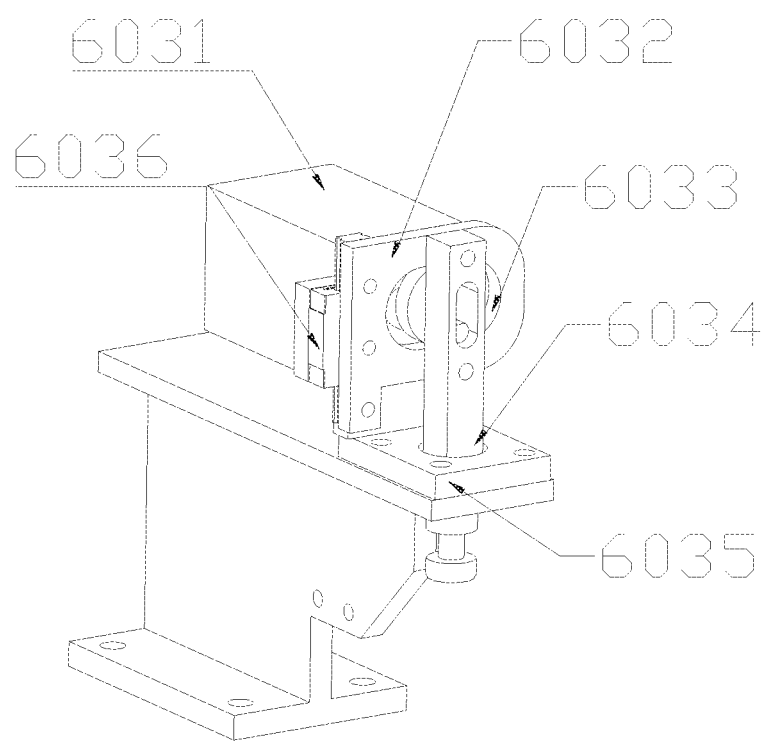
FIG. 32 is a structural schematic diagram of a power component of the seasoning mechanism shown in FIG. 30.
Figure 33:
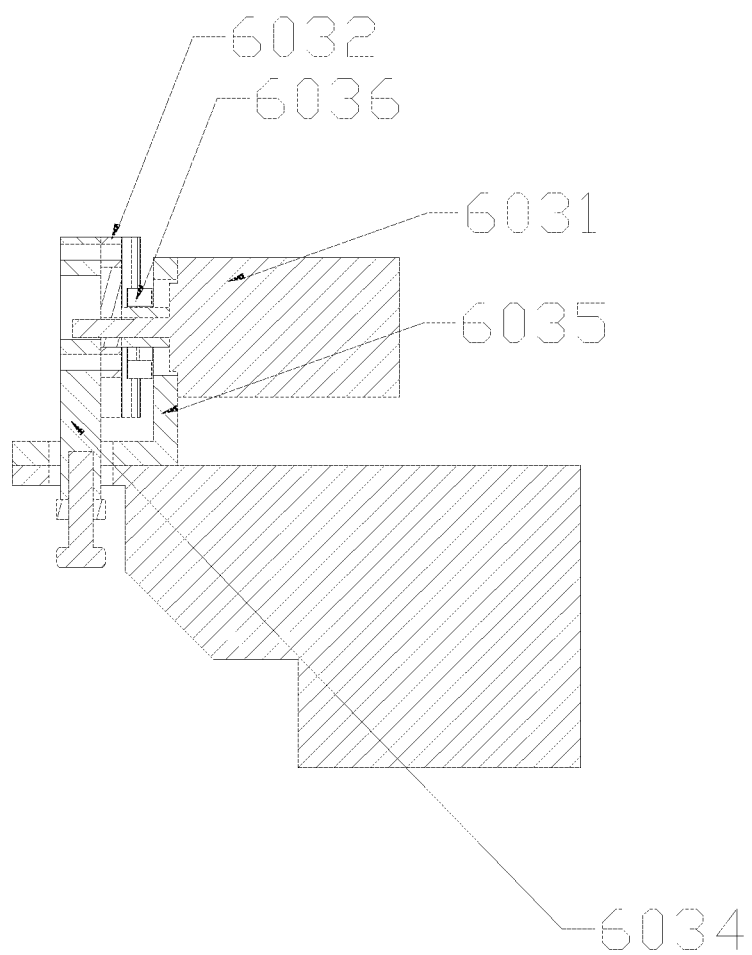
FIG. 33 is a schematic structural view of a longitudinal section of the power component shown in FIG. 32.

Referring to FIG. 14, in optional embodiments, the shaking mechanism 407 comprises a shaking motor 4071, an eccentric wheel, and a box-holding mounting plate 4072. The shaking motor 4071 is mounted on the rotating disc 404, and the eccentric wheel is arranged at an output end of the shaking motor 4071.

One end of the box-holding mounting plate 4072 is arranged with a swing rod 4074, and an end of the swing rod 4074 away from the box-holding mounting plate 4072 is hinged on the rotating disc 404.

The swing rod 4074 is provided thereon with a second sliding groove 4073, and the eccentric wheel is arranged inside the second sliding groove 4073. The rotating disc 404 is provided thereon with a limit component 4075, wherein the limit component 4075 is provided with a lateral opening 40751. The swing rod 4074 is assembled in the lateral opening 40751, and the limit component 4075 is configured to restrict the upward and downward movement of the swing rod 4074.

One end of the swing rod 4074 is hinged on the rotating disc 404, and the eccentric wheel enables the swing rod 4074 to swing, thereby achieving the shaking of the box-holding mounting plate 4072. To enable the swing rod 4074 to swing in a plane, the swing rod 4074 is arranged within the lateral opening 40751 of the limit component 4075. The limit component 4075 restricts the upward and downward movement of the swing rod 4074.

In optional embodiments, the box-holding component 408 comprises a box-holding main body 4081 and a holding hoop 4082, wherein the holding hoop 4082 is sheathed on the box-holding main body 4081 and the holding hoop 4082 is fixed on the box-holding mounting plate 4072.

A lower end of the box-holding main body 4081 is provided with two lower support protrusions 40811, and the two lower support protrusions 40811 cooperate to support the paper box 900. The box-holding main body 4081 is provided thereon with a first notch 40813, and the paper box 900 is taken out from the box-holding main body 4081 through the first notch 40813. A detection hole 40812 is arranged on the box-holding main body 4081, and the second sensor component 409 detects whether there is a paper box 900 inside the box-holding main body 4081 through the detection hole 40812.

The second sensor component 409 includes an infrared emitter and an infrared receiver. When the paper box 900 is inserted into the box-holding main body 4081, the infrared receiver cannot receive the infrared emitted by the infrared emitter, thereby determining that the box-holding main body 4081 is filled with the paper box 900.

The box-holding main body 4081 is provided with an upper opening, and the paper box 900 is assembled into the box-holding main body 4081 through the upper opening of the box-holding main body 4081. The lower support protrusion 40811 provided at the lower end of the box-holding main body 4081 serves to support the paper box 900, thereby preventing the paper box 900 from falling out from the lower end of the box-holding main body 4081.

To facilitate the placement of the paper box 900 onto the box-holding main body 4081 by the box-taking mechanism 300, a first notch 40813 is provided on the box-holding main body 4081. The flange 901 of the paper box 900 placed into the box-holding main body 4081 corresponds to the first notch 40813, making it convenient to retrieve the paper box 900.

The holding hoop 4082 is sleeved outside the box-holding main body 4081, and the holding hoop 4082 is configured to connect with the box-holding mounting plate 4072. This realizes that the box-holding component 408 is fixed to the box-holding mounting plate 4072.

In optional embodiments, the weighing and packing mechanism 500 comprises a large funnel component 501, a vibrating tray 502, and a packing component 503.

The large funnel component 501 comprises a large funnel 5011 and a large funnel bracket 5012. The large funnel 5011 is arranged on the large funnel bracket 5012, and the large funnel bracket 5012 is arranged on the frame body 100.

The vibrating tray 502 is arranged at a lower end of the large funnel 5011. The vibrating tray 502 is configured to convey the fries from the large funnel 5011 to the packing component 503.

The large funnel 5011 is configured to receive the fries. The fries in the large funnel 5011 enter the vibrating tray 502, and with the vibration of the vibrating tray 502, the fries gradually fall off from the vibrating tray 502. The fallen fries drop onto the packing component 503.

In optional embodiments, the packing component 503 comprises a material box 5031, a material box bracket 5032, a packing mounting plate 5033, and a packing motor 5036.

The material box 5031 is configured to receive the fries dropped from the vibrating tray 502, and the material box 5031 is arranged on the material box bracket 5032.

A weighing sensor 5037 is arranged on the frame body 100, and a weighing support bracket 5034 is arranged on the weighing sensor 5037.

The packing mounting plate 5033 is hinged on the weighing support bracket 5034, and the packing motor 5036 is arranged on the packing mounting plate 5033.

The material box bracket 5032 is arranged on the packing mounting plate 5033 through a second sliding component 5038. The material box bracket 5032 is provided thereon with a third sliding groove 50331, and the eccentric wheel on the packing motor 5036 is arranged within the third sliding groove 50331. The packing motor 5036 enables the material box bracket 5032 to move back and forth in a direction restricted by the second sliding component 5038.

A packing rotation motor 5035 is arranged on the weighing support bracket 5034, and the packing rotation motor 5035 is connected to the packing mounting plate 5033 and enables the packing mounting plate 5033 to rotate.

The weighing sensor 5037 is arranged on the frame body 100, and the weighing support bracket 5034 is arranged on the weighing sensor 5037. The packing motor 5036 enables the material box bracket 5032 to shake through the eccentric wheel, thereby allowing the material box 5031 to accommodate more fries.

When the weighing sensor 5037 measures the specified weight of fries, the packing rotation motor 5035 enables the packing mounting plate 5033 to rotate, thereby causing the material box 5031 on the packing mounting plate 5033 to rotate. Therefore, the material box 5031 is flipped, allowing the fries in the material box 5031 to be released from the material box 5031.

Referring to FIGS. 21 to 33, in optional embodiments, the weighing and packing mechanism 500 further comprises a small funnel component 504. The small funnel component 504 is arranged on a side of the large funnel component 501 away from the vibrating tray 502.

The small funnel component 504 comprises a small funnel 5041 and a small funnel bracket 5042, wherein the small funnel bracket 5042 is arranged on the frame body 100, and the small funnel 5041 is arranged on the small funnel bracket 5042. The small funnel 5041 is configured to receive the fries poured out from the material box 5031.

The rotation driver 402 enables the rotating disc 404 to rotate, causing the box-holding component 408 to move sequentially below the small funnel component 504.

To ensure that the fries falling from the material box 5031 enter the paper box 900, a small funnel component 504 is arranged above the paper box 900. The fries are guided into the paper box 900 through the small funnel 5041, thereby preventing them from falling and reducing wastage.

After one of the box-holding components 408 is filled with fries in the paper box 900, the rotation driver 402 enables the rotating disc 404 to rotate, causing other box-holding components 408 to move below the small funnel component 504.

In optional embodiments, a seasoning mechanism 600, wherein the seasoning mechanism 600 comprises a seasoning bracket 601 and a salt hopper component 602 and a power component 603 that are arranged on the seasoning bracket 601.

The seasoning bracket 601 is arranged on the frame body 100, and the salt hopper component 602 is arranged above the material box 5031.

The power component 603 comprises a seasoning motor 6031, a drive bracket 6035, a drive plate 6032, and a beating rod 6034. The drive bracket 6035 is arranged at an upper end of the seasoning bracket 601. The seasoning motor 6031 is arranged on the drive bracket 6035.

The drive plate 6032 is arranged on a side of the drive bracket 6035 away from the seasoning motor 6031, and a third sliding component 6036 is arranged between the drive plate 6032 and the drive bracket 6035.

The drive plate 6032 is provided thereon with a fourth sliding groove 6033, and an eccentric wheel of the seasoning motor 6031 is arranged within the fourth sliding groove 6033. The beating rod 6034 is arranged on the drive plate 6032.

The salt hopper components 602 comprise a salt hopper main body 6021, a salt hopper cover 6022, a material feeding rod 6023, and a reset spring 6024; and the salt hopper main body 6021 is arranged on the seasoning bracket 601.

A lower end of the salt hopper main body 6021 is provided with a material feeding hole, and an upper limit hole is arranged on the salt hopper cover 6022.

The material feeding rod 6023 comprises an upper guiding rod 60231, a middle limiting rod 60232, and a lower sealing end 60234 which are sequentially arranged. The upper guiding rod 60231 passes through the upper limit hole, the middle limiting rod 60232 is arranged inside the salt hopper main body 6021, and the lower sealing end 60234 is configured to seal the material feeding hole.

The reset spring 6024 is sheathed on the upper guiding rod 60231, and a limit nut 6025 is arranged on the upper guiding rod 60231. One end of the reset spring 6024 abuts against the limit nut 6025 and the other end abuts against the salt hopper cover 6022.

The reset spring 6024 is configured to impart a tendency for the lower sealing end 60234 to move toward the beating rod 6034. A diameter of the middle limiting rod 60232 is larger than the upper limit hole. When the middle limiting rod 60232 abuts against the salt hopper cover 6022, the lower sealing end 60234 seals the material feeding hole.

A material-carrying groove 60233 is formed between the lower sealing end 60234 and the middle limiting rod 60232, and the material-carrying groove 60233 is configured to convey the material from inside of the salt hopper main body 6021 to outside of the salt hopper main body 6021.

The seasoning mechanism 600 is arranged above the material box 5031. When seasoning is required, the seasoning motor 6031 enables the beating rod 6034 to depress the material feeding rod 6023, causing the material feeding rod 6023 to move downward. At this point, the lower sealing end 60234 moves away from the material feeding hole, allowing salt or other seasonings in the salt hopper main body 6021 to fall into the material box 5031 through the material feeding hole. This allows the fries in the material box 5031 to be sprinkled with salt.

When the beating rod 6034 moves upward, with the material feeding rod 6023 under the action of the reset spring 6024, the lower sealing end 60234 moves toward the material feeding hole and blocks the material feeding hole. Since the middle limiting rod 60232 cannot enter the upper limit hole, when the middle limiting rod 60232 abuts the salt hopper cover 6022, the lower sealing end 60234 precisely seals the material feeding hole.

The material-carrying groove 60233 is located inside the salt hopper main body 6021, and the material inside the salt hopper main body 6021 enters the material-carrying groove 60233. When the material feeding rod 6023 moves downward, the material-carrying groove 60233 moves out from the lower end of the salt hopper main body 6021, and the material in the material-carrying groove 60233 falls into the material box 5031, thus achieving the seasoning of the fries. The seasoning mechanism 600 is configured for salt and can also be configured for other seasonings such as cumin.

The power component 603 can be provided with a cylinder connected to the beating rod 6034. This power component 603 has a simple structure but requires an additional air supply.

Figure 34:
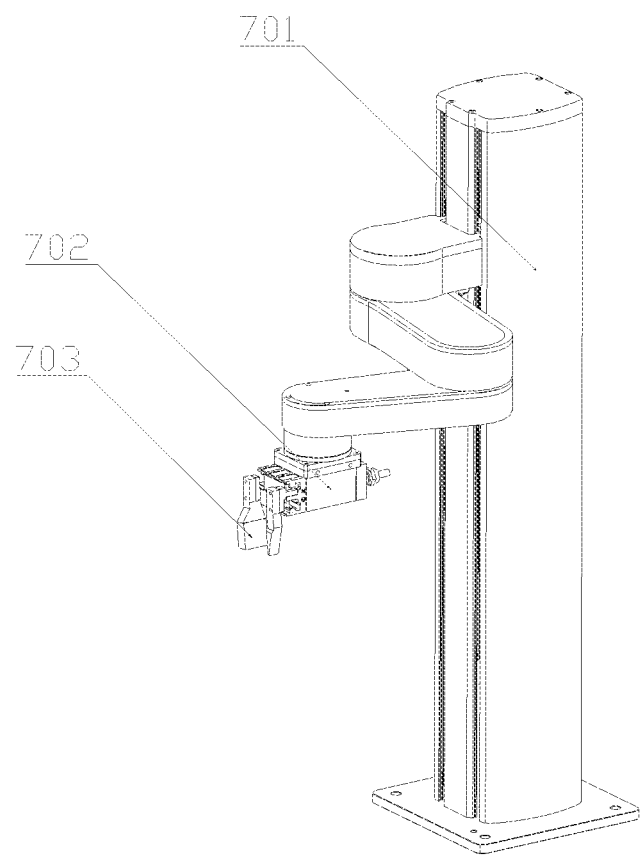
FIG. 34 is a structural schematic diagram of a putting mechanism of the fries box-packing machine shown in FIG. 1.

Referring to FIG. 34, in optional embodiments, a putting mechanism 700 is comprised, wherein the putting mechanism 700 comprises a robotic arm component 701, a gripper 702, and a finger component 703. The robotic arm component 701 is arranged on the frame body 100, the gripper 702 is arranged at an end of the robotic arm component 701, the finger component 703 is arranged on the gripper 702, and the finger component 703 is configured to grip the paper box 900.

The finger component 703 comprises a wide gripping finger and a narrow gripping finger, wherein the wide gripping finger and the narrow gripping finger work together to hold the paper box 900. This way, the putting mechanism 700 can remove the paper box 900 from the box-holding component 408 and place it on the finished product rack component 800.

Generally, the finger component 703 holds the flange 901 of the paper box 900, and since the flange 901 of the paper box 900 corresponds to the first notch 40813, the box-holding main body 4081 does not affect the finger component 703 holding the paper box 900.

It is noted that the robotic arm component 701, the gripper 702, and the finger component 703 are all existing technology.

Figure 35:
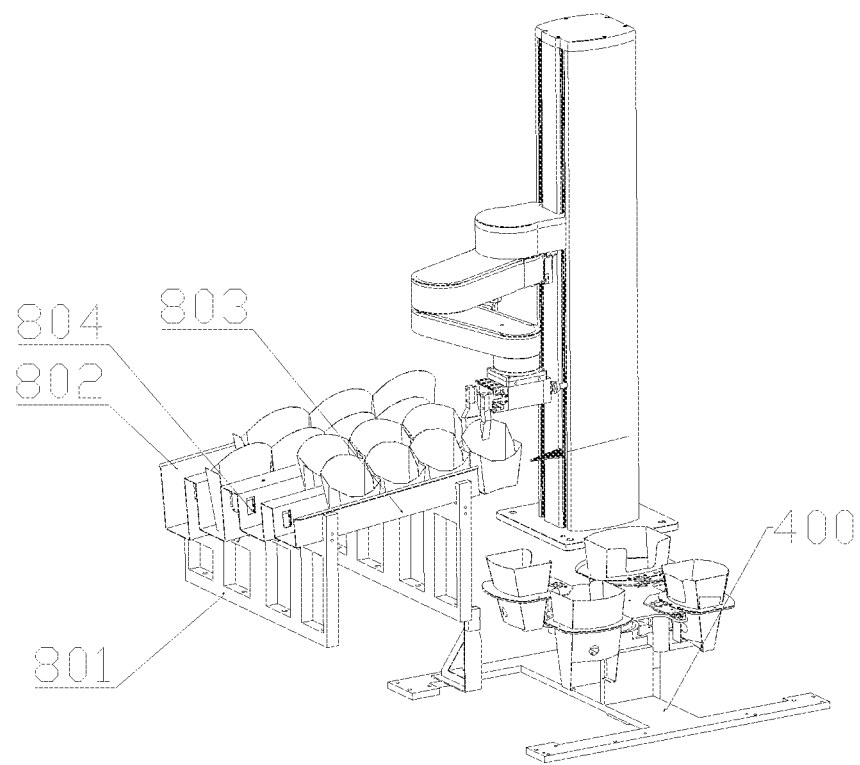
FIG. 35 is a schematic diagram of a positional relationship of the putting mechanism, the finished product rack component, and the paper box rotation mechanism of the fries box-packing machine shown in FIG. 1.
Figure 36:
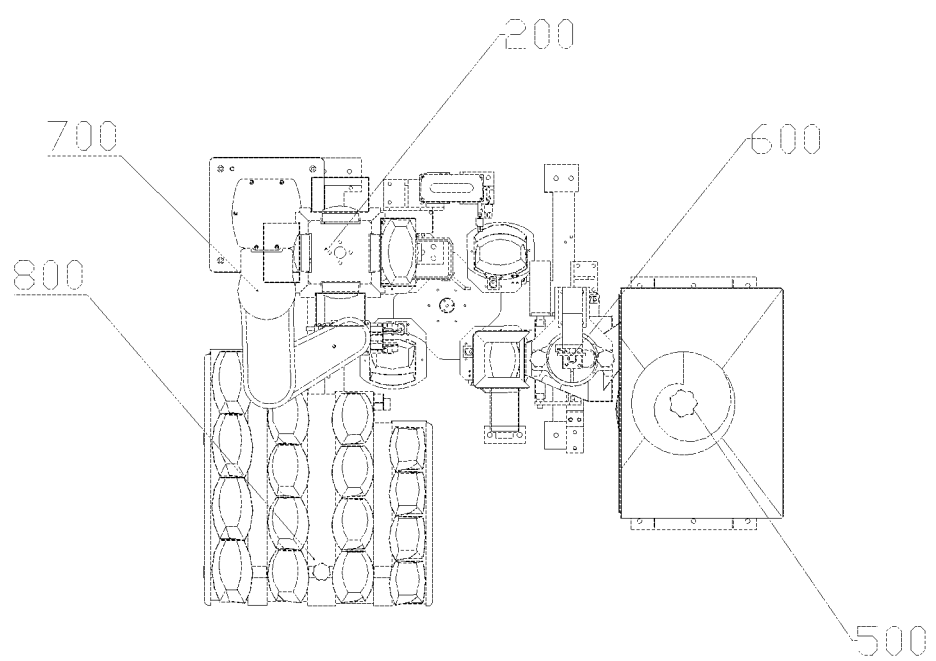
FIG. 36 is a schematic diagram of a positional relationship of the putting mechanism, the finished product rack component, the box-taking mechanism, the box storage component, and the paper box rotation mechanism of the fries box-packing machine shown in FIG. 1.
Figure 37:
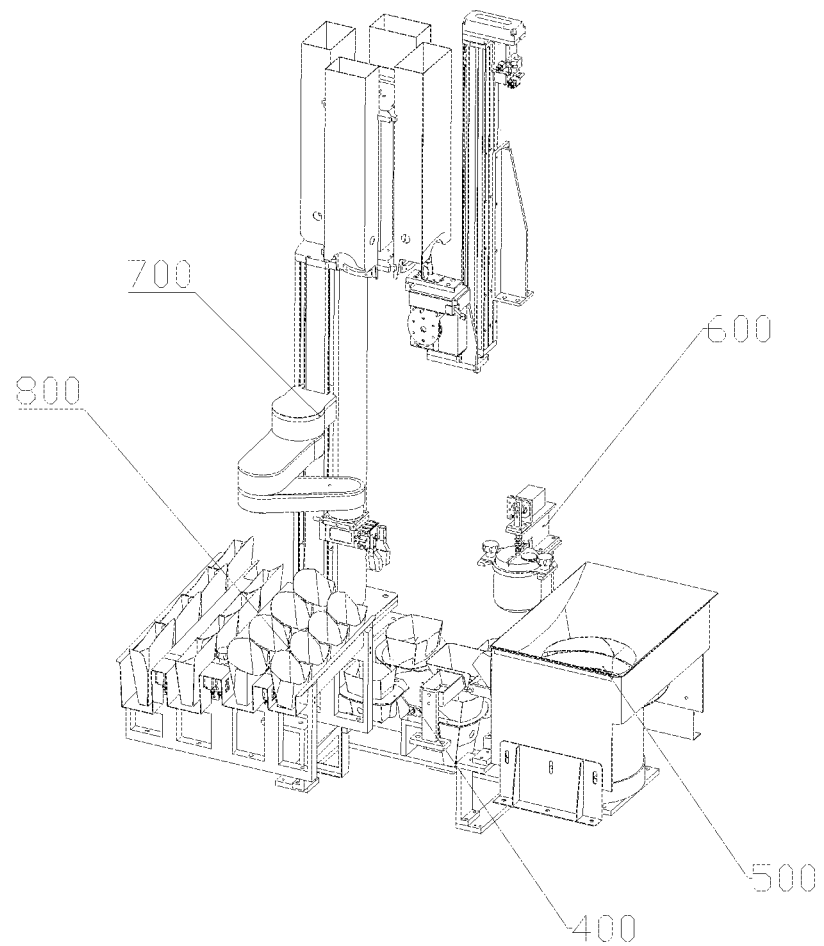
FIG. 37 is a schematic diagram of another angle of the positional relationship of the putting mechanism, the finished product rack component, the box-taking mechanism, the box storage component, and the paper box rotation mechanism of the fries box-packing machine shown in FIG. 1.
Figure 38:
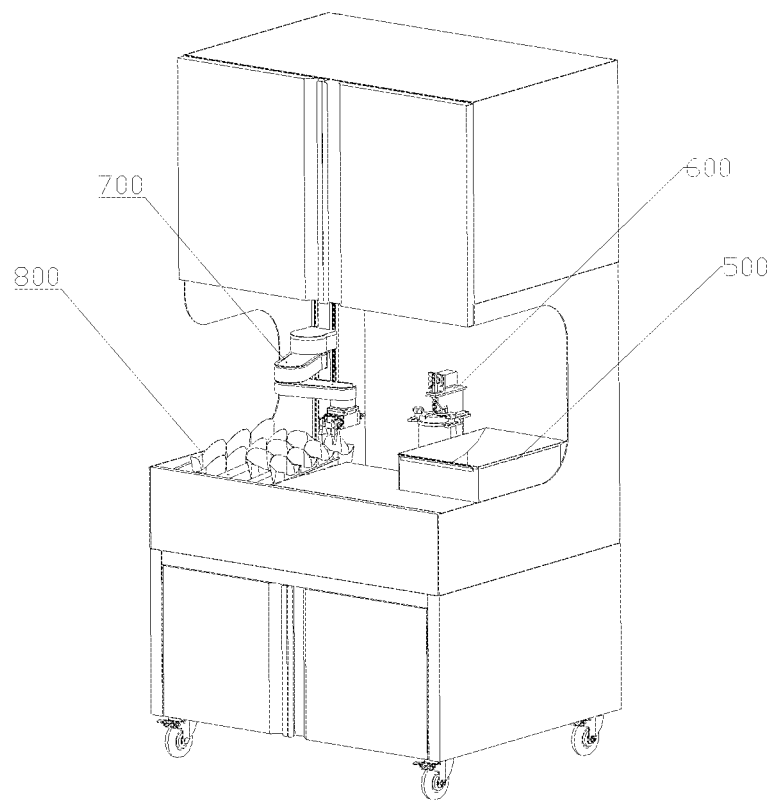
FIG. 38 is another structural schematic diagram of the fries box-packing machine provided in the embodiments of the present disclosure.

Referring to FIGS. 35 to 37, in optional embodiments, a finished product rack component 800 is further comprised, wherein the putting mechanism 700 places the paper box 900 from the paper box rotation mechanism 400 onto the finished product rack component 800.

The finished product rack component 800 comprises a finished product shelf 803, a finished product support bracket 801, and a third sensor component 804, wherein the finished product shelf 803 is provided with at least one placement groove 802. A first end of the placement groove 802 is arranged with the third sensor component 804, and the putting mechanism 700 places the paper box 900 at a second end of the placement groove 802. A height of the first end is lower than a height of the second end.

The finished product support bracket 801 is arranged on the frame body 100.

The finished product support bracket 801 is arranged on the frame body 100. Multiple placement grooves 802 are arranged on the finished product support bracket 801, with the first end of each placement slot 802 lower than the second end. Generally, one end of the extending direction of the placement groove 802 is a first end and the other end is a second end. The third sensor component 804 is arranged at the first end of the placement groove 802, and the third sensor component 804 is configured for detecting whether the placement groove 802 is filled with paper box 900.

The paper boxes 900 are sequentially placed into the placement groove 802 from the second end, and the paper boxes 900 sequentially move towards the first end. When the sensor component detects the presence of the paper box 900, it indicates that the placement groove 802 is filled with paper boxes 900 at that moment.

The width of the placement groove 802 is coordinated with the width of the paper box 900. When placing a paper box 900 into the placement groove 802, the paper box 900 generally moves along the first end of the placement groove 802.

Each box cylinder 202 can correspond to a specific size of paper box 900, and each medium-sized paper box 900 can correspond to a placement groove 802, thereby meeting the requirements of different-sized paper boxes 900 holding varying amounts of fries.

In optional embodiments, an angle between a line connecting the first end and the second end and a horizontal plane is α, wherein $2° \leq \alpha \leq 7°$.

To facilitate the smooth movement of the paper box 900 along the placement groove 802, the bottom of the placement groove 802 is angled with respect to the horizontal plane. This ensures that the paper box 900 can move more smoothly within the placement groove 802. Additionally, the paper box 900 is less likely to detach from the placement groove 802 under normal conditions without external forces.

The fries box-packing machine is further provided with universal wheels, side protective plates, and so on.

The lifting mechanism 302 of the box-taking mechanism 300 of the fries box-packing machine provided by the present disclosure can elevate the rotating mounting frame 303, thereby adjusting the height of the suction cup assembly 308. This allows the suction cup assembly 308 to move the paper box 900 from the upper end of the upper mounting plate 101 to the lower end of the upper mounting plate 101. When the suction cup assembly 308 attaches to the paper box 900, the lifting mechanism 302 separates the paper box 900 from the box storage component 200. Additionally, through the rotator 304, the suction cup assembly 308 rotates, causing the paper box 900 to rotate and enabling the opening of the paper box 900 to face upwards; therefore, the retrieval of the box is completed. In other words, the box-taking mechanism 300 can move the paper box 900 from the box storage component 200 arranged at a higher location to the lower end of the lower mounting plate, thus facilitating the retrieval of paper box 900 and improving the efficiency of packing fries into the paper box 900.

The box-taking mechanism 300 of the fries box-packing machine is able to automatically retrieve the paper boxes 900 from the box storage component 200. It then places the paper boxes 900 at the designated location of the paper box rotation mechanism 400. The paper box rotation mechanism 400 moves the box-holding component 408 having the paper boxes 900 under the small funnel component 504. After deep-frying, the fries are placed into the large funnel component 501. The vibrating tray 502 moves the fries into the packing component 503. Simultaneously, the seasoning mechanism 600 can sprinkle seasoning, such as pepper or salt, into the material box 5031. The weighing sensor 5037 accurately measures the weight of the fries inside the material box 5031. When the weight of the fries in the material box 5031 meets the requirements, the material box 5031 flips, pouring the fries from the material box 5031 into the small funnel component 504. The small funnel component 504 guides the fries into the paper box 900, thus completing the packaging of fries in the paper box 900.

The weighing sensor 5037 can be adjusted according to different requirements, and the seasoning mechanism 600 adjusts the amount of seasoning based on different specifications. This allows for the simultaneous packaging of fries in boxes of different specifications, thus overcoming the drawbacks of manual labor intensity, uneven seasoning, and difficult control of packaging quantity.

The rotation driver 402 enables the rotating disc 404 to rotate and moves the box-holding component 408, which is not filled with fries, to the bottom of the small funnel component 504. The putting mechanism 700 then moves the paper box 900, which is filled with fries, to the finished product rack component 800. This completes the automated weighing, automated seasoning, and automated placement of fries. The use of the weighing sensor 5037 for weighing ensures that the fries inside the paper box 900 meet the requirements; additionally, the consistency of the product is guaranteed.

Finally, it should be noted that the above embodiments are only used to illustrate the technical solution of the present disclosure, not to limit it; While the present disclosure has been described in detail with reference to the preceding embodiments. It will be understood by those of ordinary skill in the art that, one may still modify the technical solution described in the preceding embodiments, or replace some or all of the technical features equally. These modifications or substitutions do not depart the essence of the corresponding technical solution from the scope of the technical solution of the embodiments of the present disclosure.

What is claimed is:

1. A fries box-packing machine, comprising a frame body, a box storage component, and a box-taking mechanism, wherein the frame body is provided thereon with an upper mounting plate, the box storage component is arranged on an upper end surface of the upper mounting plate, the box-taking mechanism is arranged on the upper mounting plate, and the box-taking mechanism is configured to sequentially move a paper box of the box storage component to below the upper mounting plate;

the upper mounting plate is provided thereon with a box-taking assembly opening; and the box-taking mechanism comprises a mounting bracket, a lifting mechanism, and a pusher;

the mounting bracket is arranged on the upper mounting plate, and the lifting mechanism passes through the box-taking assembly opening; a movable end of the lifting mechanism is provided with a rotating mounting frame, the rotating mounting frame is provided thereon with a rotator, and the rotator is provided thereon with a pushing bracket; and the pusher is arranged on the pushing bracket, and a movable end of the pusher is provided with a suction cup bracket; and a suction cup assembly is arranged on the suction cup bracket, and the suction cup assembly is configured to suction the paper box.

2. The fries box-packing machine according to claim 1, wherein the box storage component comprises a rotating power mechanism, a rotating bracket, and multiple box cylinders arranged on the rotating bracket;

the rotating bracket is arranged on the rotating power mechanism, wherein the rotating power mechanism enables the rotating bracket to rotate; the multiple box cylinders are arranged on the rotating bracket; and the multiple box cylinders are evenly arranged along a circumference of the rotating bracket;

each box cylinder is provided with a plug-in component, and an insertion slot matching the plug-in component is arranged on the rotating bracket;

each box cylinder is provided therein with a lower limit baffle; multiple paper boxes are assembled inside the box cylinder, openings of the paper boxes face downward, and a bottommost paper box abuts against the lower limit baffle; and the lower limit baffle is configured to prevent the paper boxes from detaching from the box cylinder at a lower end of the box cylinder; and at least one of the box cylinders has its lower opening facing the box-taking assembly opening, and the suction cup assembly is configured to suction the paper boxes from inside of the box cylinder.

3. The fries box-packing machine according to claim 1, further comprising a paper box rotation mechanism and a weighing and packing mechanism, wherein the weighing and packing mechanism is configured to load fries based on a weight into the paper box of the paper box rotation mechanism;

the paper box rotation mechanism comprises a connecting bracket, a rotation driver, and a rotating disc, wherein the connecting bracket is arranged on the frame body, and the rotation driver is arranged on the connecting bracket; and the rotating disc is rotationally arranged on the rotation driver;

multiple shaking mechanisms are arranged on the rotating disc, wherein each shaking mechanism is provided with a box-holding component, and each box-holding component is provided with a second sensor component; and the box-holding component is configured to place the paper box, and the second sensor component is configured to detect whether a paper box exists inside the box-holding component.

4. The fries box-packing machine according to claim 3, wherein a lower end surface of the rotating disc is provided with a transition sleeve; a lower end of the transition sleeve is provided with a slip ring and a slip ring base, wherein the slip ring is arranged on the slip ring base; and the slip ring base is configured to connect with a power supply device, and the slip ring is configured to connect with the shaking mechanisms; and the transition sleeve is provided thereon with a wire through-hole, and a connecting wire that is connected to the shaking mechanisms passes through the wire through-hole.

5. The fries box-packing machine according to claim 3, wherein each shaking mechanism comprises a shaking motor, an eccentric wheel, and a box-holding mounting plate; the shaking motor is mounted on the rotating disc, and the eccentric wheel is arranged at an output end of the shaking motor;

the box-holding mounting plate is arranged on the rotating disc, and a first sliding component is arranged between the box-holding mounting plate and the rotating disc; and the box-holding mounting plate is provided thereon with a first sliding groove, and the eccentric wheel is arranged inside the first sliding groove, and the eccentric wheel enables the box-holding mounting plate to move back and forth in a direction restricted by the first sliding component.

6. The fries box-packing machine according to claim 5, wherein the box-holding component comprises a box-holding main body and a holding hoop, wherein the holding hoop is sheathed on the box-holding main body and the holding hoop is fixed on the box-holding mounting plate;

a lower end of the box-holding main body is provided with two lower support protrusions, and the two lower support protrusions cooperate to support the paper box; the box-holding main body is provided thereon with a first notch, and the paper box is taken out from the box-holding main body through the first notch; and a detection hole is arranged on the box-holding main body, and the second sensor component detects whether a paper box exists inside the box-holding main body through the detection hole.

7. The fries box-packing machine according to claim 3, wherein each shaking mechanism comprises a shaking motor, an eccentric wheel, and a box-holding mounting plate; the shaking motor is mounted on the rotating disc, and the eccentric wheel is arranged at an output end of the shaking motor;

one end of the box-holding mounting plate is arranged with a swing rod, and an end of the swing rod away from the box-holding mounting plate is hinged on the rotating disc; and the swing rod is provided thereon with a second sliding groove, and the eccentric wheel is arranged inside the second sliding groove; the rotating disc is provided thereon with a limit component, wherein the limit component is provided with a lateral opening; the swing rod is assembled in the lateral opening; and the limit component is configured to restrict a upward and downward movement of the swing rod.

8. The fries box-packing machine according to claim 7, wherein the box-holding component comprises a box-holding main body and a holding hoop, wherein the holding hoop is sheathed on the box-holding main body and the holding hoop is fixed on the box-holding mounting plate;

a lower end of the box-holding main body is provided with two lower support protrusions, and the two lower support protrusions cooperate to support the paper box; the box-holding main body is provided thereon with a first notch, and the paper box is taken out from the box-holding main body through the first notch; and a detection hole is arranged on the box-holding main body, and the second sensor component detects whether a paper box exists inside the box-holding main body through the detection hole.

9. The fries box-packing machine according to claim 3, wherein the weighing and packing mechanism comprises a large funnel component, a vibrating tray, and a packing component;

the large funnel component comprises a large funnel and a large funnel bracket; the large funnel is arranged on the large funnel bracket, and the large funnel bracket is arranged on the frame body; and the vibrating tray is arranged at a lower end of the large funnel; and the vibrating tray is configured to convey the fries from the large funnel to the packing component.

10. The fries box-packing machine according to claim 9, wherein the packing component comprises a material box, a material box bracket, a packing mounting plate, and a packing motor;

the material box is configured to receive the fries dropped from the vibrating tray, and the material box is arranged on the material box bracket;

a weighing sensor is arranged on the frame body, and a weighing support bracket is arranged on the weighing sensor;

the packing mounting plate is hinged on the weighing support bracket, and the packing motor is arranged on the packing mounting plate;

the material box bracket is arranged on the packing mounting plate through a second sliding component; the material box bracket is provided thereon with a third sliding groove, and an eccentric wheel on the packing motor is arranged within the third sliding groove; and the packing motor enables the material box bracket to move back and forth in a direction restricted by the second sliding component; and a packing rotation motor is arranged on the weighing support bracket, and the packing rotation motor is connected to the packing mounting plate and enables the packing mounting plate to rotate.

11. The fries box-packing machine according to claim 10, wherein the weighing and packing mechanism further comprises a small funnel component; the small funnel component is arranged on a side of the large funnel component away from the vibrating tray;

the small funnel component comprises a small funnel and a small funnel bracket, wherein the small funnel bracket is arranged on the frame body, and the small funnel is arranged on the small funnel bracket; and the small funnel is configured to receive the fries poured out from the material box; and the rotation driver enables the rotating disc to rotate, causing the box-holding components to move sequentially below the small funnel component.

12. The fries box-packing machine according to claim 10, further comprising a seasoning mechanism, wherein the seasoning mechanism comprises a seasoning bracket and a salt hopper component and a power component that are arranged on the seasoning bracket;

the seasoning bracket is arranged on the frame body, and the salt hopper component is arranged above the material box;

the power component comprises a seasoning motor, a drive bracket, a drive plate, and a beating rod; the drive bracket is arranged at an upper end of the seasoning bracket; and the seasoning motor is arranged on the drive bracket;

the drive plate is arranged on a side of the drive bracket away from the seasoning motor, and a third sliding component is arranged between the drive plate and the drive bracket;

the drive plate is provided thereon with a fourth sliding groove, an eccentric wheel of the seasoning motor is arranged within the fourth sliding groove, and the beating rod is arranged on the drive plate;

the salt hopper component comprises a salt hopper main body, a salt hopper cover, a material feeding rod, and a reset spring; and the salt hopper main body is arranged on the seasoning bracket;

a lower end of the salt hopper main body is provided with a material feeding hole, and an upper limit hole is arranged on the salt hopper cover;

the material feeding rod comprises an upper guiding rod, a middle limiting rod, and a lower sealing end which are sequentially arranged; the upper guiding rod passes through the upper limit hole, the middle limiting rod is arranged inside the salt hopper main body, and the lower sealing end is configured to seal the material feeding hole;

the reset spring is sheathed on the upper guiding rod, a limit nut is arranged on the upper guiding rod, and one end of the reset spring abuts against the limit nut and the other end abuts against the salt hopper cover;

the reset spring is configured to impart a tendency for the lower sealing end to move toward the beating rod; a diameter of the middle limiting rod is larger than the upper limit hole; when the middle limiting rod abuts against the salt hopper cover, the lower sealing end seals the material feeding hole; and a material-carrying groove is formed between the lower sealing end and the middle limiting rod, and the material-carrying groove is configured to convey a material from inside of the salt hopper main body to outside of the salt hopper main body.

13. The fries box-packing machine according to claim 3, further comprising a putting mechanism, wherein the putting mechanism comprises a robotic arm component, a gripper, and a finger component; the robotic arm component is arranged on the frame body, the gripper is arranged at an end of the robotic arm component, the finger component is arranged on the gripper, and the finger component is configured to grip the paper box.

14. The fries box-packing machine according to claim 13, further comprising a finished product rack component, wherein the putting mechanism places the paper box from the paper box rotation mechanism onto the finished product rack component;

the finished product rack component comprises a finished product shelf, a finished product support bracket, and a third sensor component, wherein the finished product shelf is provided with at least one placement groove;

a first end of the placement groove is arranged with the third sensor component, the putting mechanism places the paper box at a second end of the placement groove, and a height of the first end is lower than a height of the second end; and the finished product support bracket is arranged on the frame body.

15. The fries box-packing machine according to claim 14, wherein an angle between a line connecting the first end and the second end and a horizontal plane is $\alpha$, wherein $2° \leq \alpha \leq 7°$.

* * * * *